US010212435B2

(12) United States Patent
Ramasubramonian et al.

(10) Patent No.: US 10,212,435 B2
(45) Date of Patent: Feb. 19, 2019

(54) DEVICE AND METHOD FOR SCALABLE CODING OF VIDEO INFORMATION

(71) Applicant: QUALCOMM Incorporated, San Diego, CA (US)

(72) Inventors: Adarsh Krishnan Ramasubramonian, San Diego, CA (US); Ying Chen, San Diego, CA (US); Ye-Kui Wang, San Diego, CA (US); Fnu Hendry, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 710 days.

(21) Appl. No.: 14/513,030

(22) Filed: Oct. 13, 2014

(65) Prior Publication Data

US 2015/0103903 A1 Apr. 16, 2015

Related U.S. Application Data

(60) Provisional application No. 61/890,868, filed on Oct. 14, 2013.

(51) Int. Cl.
*H04N 19/30* (2014.01)
*H04N 19/187* (2014.01)
(Continued)

(52) U.S. Cl.
CPC ........... *H04N 19/187* (2014.11); *H04N 19/30* (2014.11); *H04N 19/46* (2014.11); *H04N 19/68* (2014.11);
(Continued)

(58) Field of Classification Search
CPC ...................................... H04N 9/09
(Continued)

(56) References Cited

U.S. PATENT DOCUMENTS 8,345,743 B2 1/2013 Shi et al.
2006/0291562 A1 12/2006 Lee et al.
(Continued)

FOREIGN PATENT DOCUMENTS

CN 101208958 A 6/2008
CN 102100069 A 6/2011
(Continued)

OTHER PUBLICATIONS

Boyce J: "BoG report on random access and cross-layer alignment of pictures types", 14. JCT-VC Meeting; Jul. 25, 2013-Aug. 2, 2013; Vienna; (Joint Collaborative Team on Video Coding of ISO/IEC JTC1/SC29/WG11 and ITU-TSG.16 ); URL: http://wftp3.itu.int/av-arch/jctvc-site/ ,, No. JCTVC-N0373, XP030114926, Jul. 27, 2013 (Jul. 27, 2013), 3 pages.

(Continued)

*Primary Examiner* — Jeremiah C Hallenbeck-Huber
*Assistant Examiner* — Amir Shahnami
(74) *Attorney, Agent, or Firm* — Knobbe, Martens, Olson & Bear, LLP

(57) ABSTRACT

An apparatus configured to code video information includes a memory unit and a processor in communication with the memory unit. The memory unit is configured to store video information associated with a first video layer having a first picture in a first access unit. The processor is configured to determine whether the first picture in the first access unit is an intra random access point (IRAP) picture, and in response to determining that the first picture in the first access unit is an IRAP picture, provide an indication, in a bitstream, to reset a picture order count (POC) of at least one other picture in the first access unit, wherein the at least one other picture is not an IRAP picture. The processor may encode or decode the video information.

25 Claims, 13 Drawing Sheets

(51) Int. Cl.
*H04N 19/46* (2014.01)
*H04N 19/70* (2014.01)
*H04N 19/80* (2014.01)
*H04N 19/68* (2014.01)
*H04N 19/86* (2014.01)

(52) U.S. Cl.
CPC ............ *H04N 19/70* (2014.11); *H04N 19/80* (2014.11); *H04N 19/86* (2014.11)

(58) Field of Classification Search
USPC ......................................................... 375/240
See application file for complete search history.

(56) References Cited

U.S. PATENT DOCUMENTS

| | | | |
|---|---|---|---|
| 2010/0091837 A1 | 4/2010 | Zhu et al. | |
| 2010/0189182 A1 | 7/2010 | Hannuksela | |
| 2011/0110418 A1 | 5/2011 | Lu et al. | |
| 2013/0089152 A1* | 4/2013 | Wang | H04N 19/00951 375/240.23 |
| 2013/0094773 A1 | 4/2013 | Misra et al. | |
| 2013/0094774 A1* | 4/2013 | Misra | H04N 19/70 382/233 |
| 2013/0114741 A1 | 5/2013 | Sullivan et al. | |
| 2013/0272430 A1* | 10/2013 | Sullivan | H04N 19/70 375/240.26 |
| 2014/0092976 A1* | 4/2014 | Deshpande | H04N 19/58 375/240.16 |
| 2014/0301439 A1 | 10/2014 | Chen et al. | |
| 2015/0043656 A1* | 2/2015 | Choi | H04N 19/597 375/240.26 |
| 2015/0063463 A1* | 3/2015 | Choi | H04N 19/70 375/240.25 |
| 2015/0103922 A1 | 4/2015 | Ramasubramonian et al. | |
| 2015/0103923 A1 | 4/2015 | Ramasubramonian et al. | |
| 2015/0156501 A1* | 6/2015 | Hannuksela | H04N 19/70 375/240.12 |
| 2015/0222914 A1 | 8/2015 | Yamamoto et al. | |
| 2016/0241850 A1* | 8/2016 | Deshpande | H04N 19/70 |
| 2016/0269740 A1* | 9/2016 | Choi | H04N 19/70 |

FOREIGN PATENT DOCUMENTS

| | | |
|---|---|---|
| JP | 2009272660 A | 11/2009 |
| WO | 08061164 | 5/2008 |

OTHER PUBLICATIONS

Boyce J: "BoG report on random access and cross-layer alignment of pictures types", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-E0306, XP030131368, Jul. 27, 2013 (Jul. 27, 2013), 3 pages.

Chen Y., et al., "MV-HEVC/SHVC HLS: Cross-layer POC alignment", 14. JCT-VC Meeting; Jul. 25, 2013-Aug. 2, 2013; Vienna; (Joint Collaborative Team on Video Coding of ISO/IEC JTC1/SC29/WG11 and ITU-TSG.16 ); URL: http://wftp3.itu.int/av-arch/jctvc-site/,, No. JCTVC-N0244, XP030114760, Jul. 16, 2013 (Jul. 16, 2013), 4 pages.

Chen Y., et al., "MV-HEVC/SHVC HLS: Cross-layer POC alignment," 5. JCT-3V Meeting; Mar. 27, 2013-Aug. 2, 2013; Vienna; (The Joint Collaborative Team on 3D Video Coding Extension Development of ISO/IEC JTC1/SC29/WG11 and ITU-T SG.16); Retrieved from the Internet < URL: http://phenix.int-evry.fr/jct2/, >, No. JCT3V-E0075, Jul. 16, 2013 (Jul. 16, 2013), 4 pages, XP030131078.

Choi B., et al., "3D-HEVC-CE9: Results on prediction structure for viewpoint switching of Samsung", 99. MPEG Meeting; Feb. 6, 2012-Feb. 10, 2012; San Josa CR; (Motion Picture Expert Group or ISO/IEC JTC1/SC29/WG11) No. m23649, Feb. 4, 2012 (Feb. 4, 2012), XP030052174, 8 Pages.

Choi B., et al., "On Random Access Pictures", 1. JCT-3V Meeting; 101. MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/., No. JCT3V-A0117, Jul. 11, 2012 (Jul. 11, 2012), XP030130116, pp. 1-6.

Choi B., et al., "On random access point for HEVO extension", 13. JCT-VC Meeting; 104. MPEG Meeting; Apr. 18, 2013-Apr. 26, 2013; Ingheon; (Joint Collaborative Team on Video Coding of ISO/IEC JTC1/SC29/WG11 and ITU-T SG.16); URL: http://wftp3.itu.int/av-arch/jctvc-site/ No. JCTVC-M0168, pp. 1-4; Apr. 9, 2013 (Apr. 9, 2013), XP030114125.

Hannuksela M.M., "MV-HEVC/SHVC HLS: Layer-tree POC", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0056-V2, Jan. 10, 2014 (Jan. 10, 2014), XP030115524, Chapters 1-3; abstract, pp. 1-16.

International Search Report and Written Opinion—PCT/US2014/060492—ISA/EPO—dated Jan. 20, 2015.

Lee H., et al., "MV-HEVC/SHVC HLS: On Poc reset for long-term reference pictures", 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-F0047, p. 1-6, Oct. 14, 2013 (Oct. 14, 2013), XP030131447.

Ramasubramonian A.K., et al., "MV-HEVC/SHVC HLS: On picture order count," 15, JCT-VC Meeting; Oct. 23, 2013-Nov. 1, 2013; Geneva; (Joint collaborative Team on Video Coding of ISO/IEC JTC1/SC29/WG11 and ITU-T SG.16); Retrieved from the Internet < URL: http://wftp3.itu.int/av-arch/jctvc-site/, > No. JCTVC-00213, Oct. 15, 2013 (Oct. 15, 2013), 10 pages, XP030115261.

Chen J. et al., "High Efficiency Video Coding (HEVC) Scalable Extension Draft 3", Joint Collaborative Team on Video Coding (JCT-VC) of ITU-T SG 16 WP 3 and ISO/IEC JTC 1/SC 29/WG 11, Doc. JCTVC-N1008_v3, 14th Meeting, Vienna, AT, Jul. 25-Aug. 2, 2013, 68 pages.

Boyce J., "BoG Report on SHVC/MV-HEVC HLS Topics," Joint Collaborative Team on 3D Video Coding Extensions 5th Meeting: Vienna, JCT3V-E0307-V5.zip, Aug. 1, 2013, JCTVC-N0374_JCT3V-E0306_V7.doc, 21 pages.

Ramasubramonian A.K., et al., "MV-HEVC/SHVC HLS: On picture order count", 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0073, Oct. 15, 2013 (Oct. 15, 2013), XP030131481, 10 pages.

Boyce J., BoG Report on SHVC/MV-HEVC HLS Topics, Joint Collaborative Team on Video Coding (JCT-VC) 14th Meeting: Vienna, JCTVC-N0374-V9.zip, Aug. 1, 2013, JCTVC-N0374_JCT3V-E0306-V6.doc, 21 pages.

* cited by examiner

DEVICE AND METHOD FOR SCALABLE CODING OF VIDEO INFORMATION

CROSS-REFERENCE TO RELATED APPLICATIONS

This application claims priority to U.S. Provisional No. 61/890,868, filed Oct. 14, 2013.

TECHNICAL FIELD

This disclosure relates to the field of video coding and compression, particularly to scalable video coding (SVC), multiview video coding (MVC), or 3D video coding (3DV).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding (SVC) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In SVC, a picture order count (POC) may be used to indicate the order in which the pictures are to be output or displayed. Further, in some implementations, the value of the POC may be reset (e.g., set to zero, set to some value signaled in the bitstream, or derived from information included in the bitstream) whenever certain types of pictures appear in the bitstream. For example, when certain random access point pictures appear in the bitstream, the POC may be reset. When the POC of a particular picture is reset, the POCs of any pictures that precede the particular picture in decoding order may also be reset, for example, to maintain the relative order in which those pictures are to be output or displayed. The POCs of any pictures that follow the particular picture in decoding order may be signaled in the bitstream, with the assumption that the POC reset took place in connection with the particular picture. For example, if the POC is reset to a value of 0 at Picture A that immediately precedes Picture B in decoding order and output order, the POC signaled in the bitstream for Picture B may have a value of 1.

However, in certain cases, the particular picture may not be available to the decoder. For example, the particular picture may be lost during transmission or may be removed from the bitstream to satisfy bandwidth constraints. In such a case, the decoder may not know to reset the POCs of the pictures that precede the particular picture in decoding order. This is problematic because the POCs of the pictures that follow the particular picture in decoding order are signaled or derived as if the POC reset was performed at the particular picture. Thus, in such a case, the relative order between the pictures that precede the particular picture and pictures that follow the particular picture may become incorrect.

Thus, an improved coding method for deriving the POC values, especially in the event that certain pictures become unavailable, is desired.

The systems, methods and devices of this disclosure each have several innovative aspects, no single one of which is solely responsible for the desirable attributes disclosed herein.

In one aspect, an apparatus configured to code (e.g., encode or decode) video information includes a memory unit and a processor in communication with the memory unit. The memory unit is configured to store video information associated with a first video layer having a first picture in a first access unit. The processor is configured to determine whether the first picture in the first access unit is an intra random access point (IRAP) picture, and in response to determining that the first picture in the first access unit is an IRAP picture, provide an indication, in a bitstream, to reset a picture order count (POC) of at least one other picture in the first access unit, wherein the at least one other picture is not an IRAP picture.

In another aspect, a method of encoding video information comprises determining whether a first picture in a first access unit of a first video layer is an intra random access point (RAP) picture, and in response to determining that the first picture in the first access unit is an IRAP picture, providing an indication, in a bitstream, to reset a picture order count (POC) of at least one other picture in the first access unit, wherein the at least one other picture is not an IRAP picture.

In another aspect, a non-transitory computer readable medium comprises code that, when executed, causes an apparatus to perform a process. The process includes storing video information associated with a first video layer having a first picture in a first access unit, determining whether the first picture in the first access unit is an intra random access point (IRAP) picture, and in response to determining that the first picture in the first access unit is an IRAP picture, providing an indication, in a bitstream, to reset a picture order count (POC) of at least one other picture in the first access unit, wherein the at least one other picture is not an IRAP picture.

In another aspect, a video coding device configured to code video information comprises means for storing video information associated with a first video layer having a first picture in a first access unit, means for determining whether the first picture in the first access unit is an intra random access point (IRAP) picture, and means for providing an indication in a bitstream, in response to determining that the first picture in the first access unit is an IRAP picture, to reset a picture order count (POC) of at least one other picture in the first access unit, wherein the at least one other picture is not an IRAP picture.

DETAILED DESCRIPTION

Figure 1A:
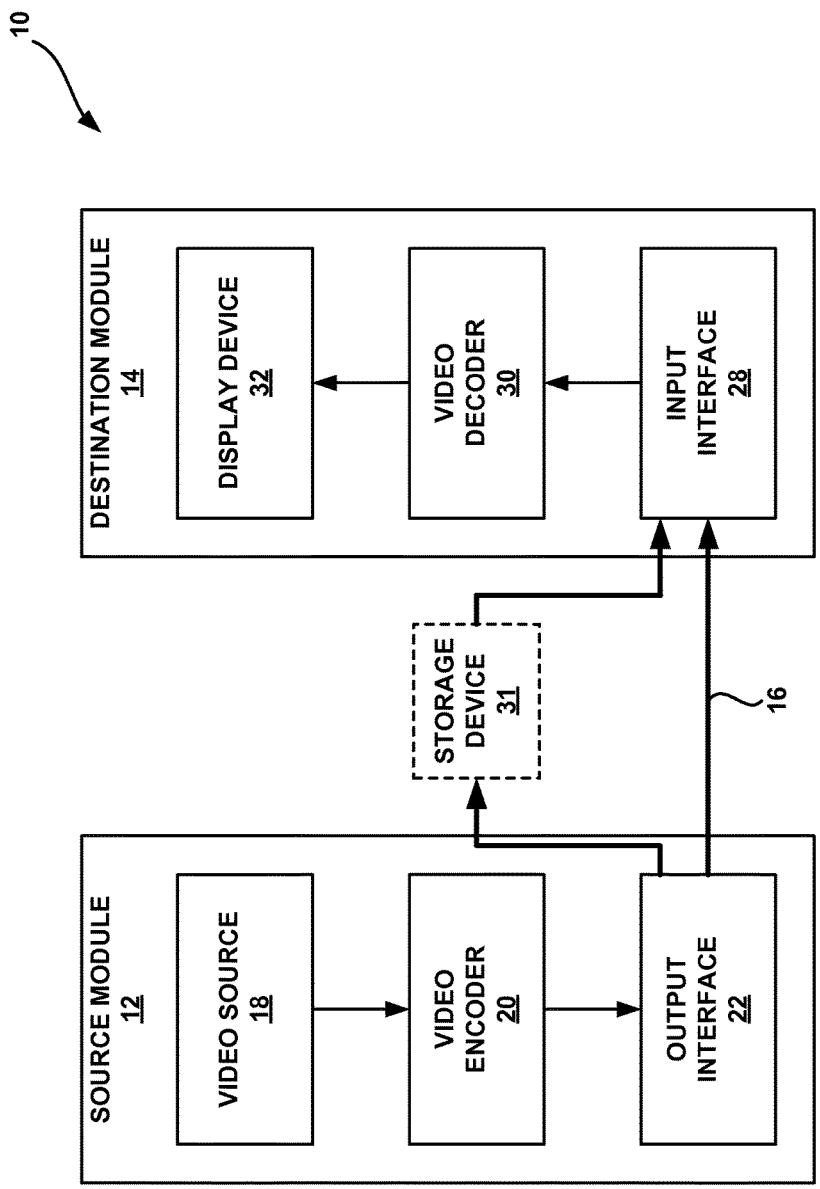
FIG. 1A is a block diagram illustrating an example video encoding and decoding system that may utilize techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Video Coding System

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
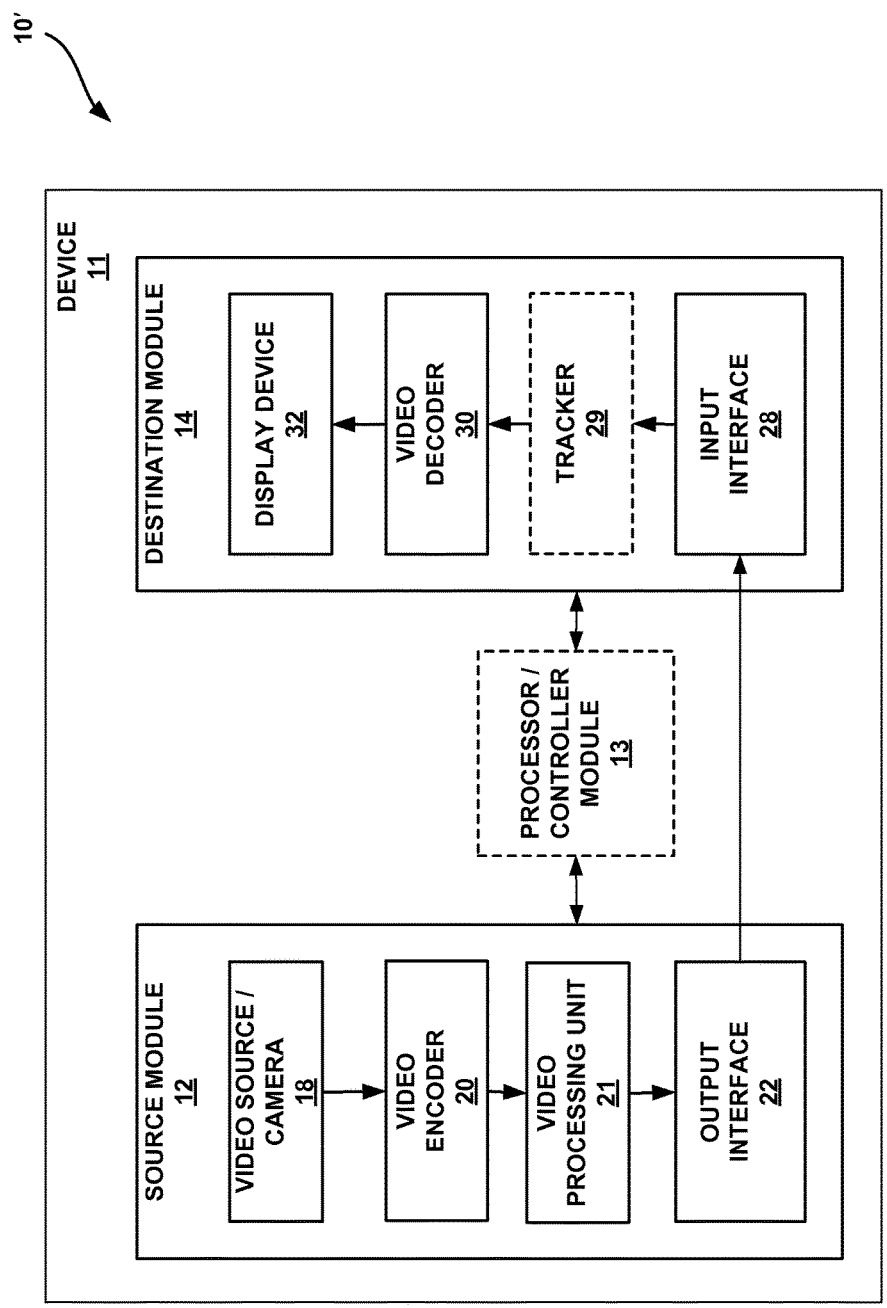
FIG. 1B is a block diagram illustrating another example video encoding and decoding system that may perform techniques in accordance with aspects described in this disclosure.

As shown in FIG. 1A, video coding system 10 includes a source module 12 that generates encoded video data to be decoded at a later time by a destination module 14. In the example of FIG. 1A, the source module 12 and destination module 14 are on separate devices—specifically, the source module 12 is part of a source device, and the destination module 14 is part of a destination device. It is noted, however, that the source and destination modules 12, 14 may be on or part of the same device, as shown in the example of FIG. 1B.

With reference once again, to FIG. 1A, the source module 12 and the destination module 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source module 12 and the destination module 14 may be equipped for wireless communication.

The destination module 14 may receive the encoded video data to be decoded via a link 16. The link 16 may comprise any type of medium or device capable of moving the encoded video data from the source module 12 to the destination module 14. In the example of FIG. 1A, the link 16 may comprise a communication medium to enable the source module 12 to transmit encoded video data directly to the destination module 14 in real-time. The encoded video data may be modulated according to a communication standard, such as a wireless communication protocol, and transmitted to the destination module 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source module 12 to the destination module 14.

Alternatively, encoded data may be output from an output interface 22 to an optional storage device 31. Similarly, encoded data may be accessed from the storage device 31 by an input interface 28. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source module 12. The destination module 14 may access stored video data from the storage device 31 via streaming or download. The file server may be any type of server capable of storing encoded video data and transmitting that encoded video data to the destination module 14. Example file servers include a web server (e.g., for a website), an FTP server, network attached storage (NAS) devices, or a local disk drive. The destination module 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source module 12 includes a video source 18, video encoder 20 and an output interface 22. In some cases, the output interface 22 may include a modulator/demodulator (modem) and/or a transmitter. In the source module 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source module 12 and the destination module 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted directly to the destination module 14 via the output interface 22 of the source module 12. The encoded video data may also (or alternatively) be stored onto the storage device 31 for later access by the destination module 14 or other devices, for decoding and/or playback. The video encoder 20 illustrated in FIGS. 1A and 1B may comprise the video encoder 20 illustrated FIG. 2A, the video encoder 23 illustrated in FIG. 2B, or any other video encoder described herein.

In the example of FIG. 1A, the destination module 14 includes an input interface 28, a video decoder 30, and a display device 32. In some cases, the input interface 28 may include a receiver and/or a modem. The input interface 28 of the destination module 14 may receive the encoded video data over the link 16. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3A, the video decoder 33 illustrated in FIG. 3B, or any other video decoder described herein.

The display device 32 may be integrated with, or external to, the destination module 14. In some examples, the destination module 14 may include an integrated display device and also be configured to interface with an external display device. In other examples, the destination module 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination modules 12, 14 are on or part of a device or user device 11. The device 11 may be a telephone handset, such as a "smart" phone or the like. The device 11 may include an optional controller/processor module 13 in operative communication with the source and destination modules 12, 14. The system 10' of FIG. 1B may further include a video processing unit 21 between the video encoder 20 and the output interface 22. In some implementations, the video processing unit 21 is a separate unit, as illustrated in FIG. 1B; however, in other implementations, the video processing unit 21 can be implemented as a portion of the video encoder 20 and/or the processor/controller module 13. The system 10' may also include an optional tracker 29, which can track an object of interest in a video sequence. The object or interest to be tracked may be segmented by a technique described in connection with one or more aspects of the present disclosure. In related aspects, the tracking may be performed by the display device 32, alone or in conjunction with the tracker 29. The system 10' of FIG. 1B, and components thereof, are otherwise similar to the system 10 of FIG. 1A, and components thereof.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the examples of FIGS. 1A and 1B, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

Video Coding Process

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPS), sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2A:
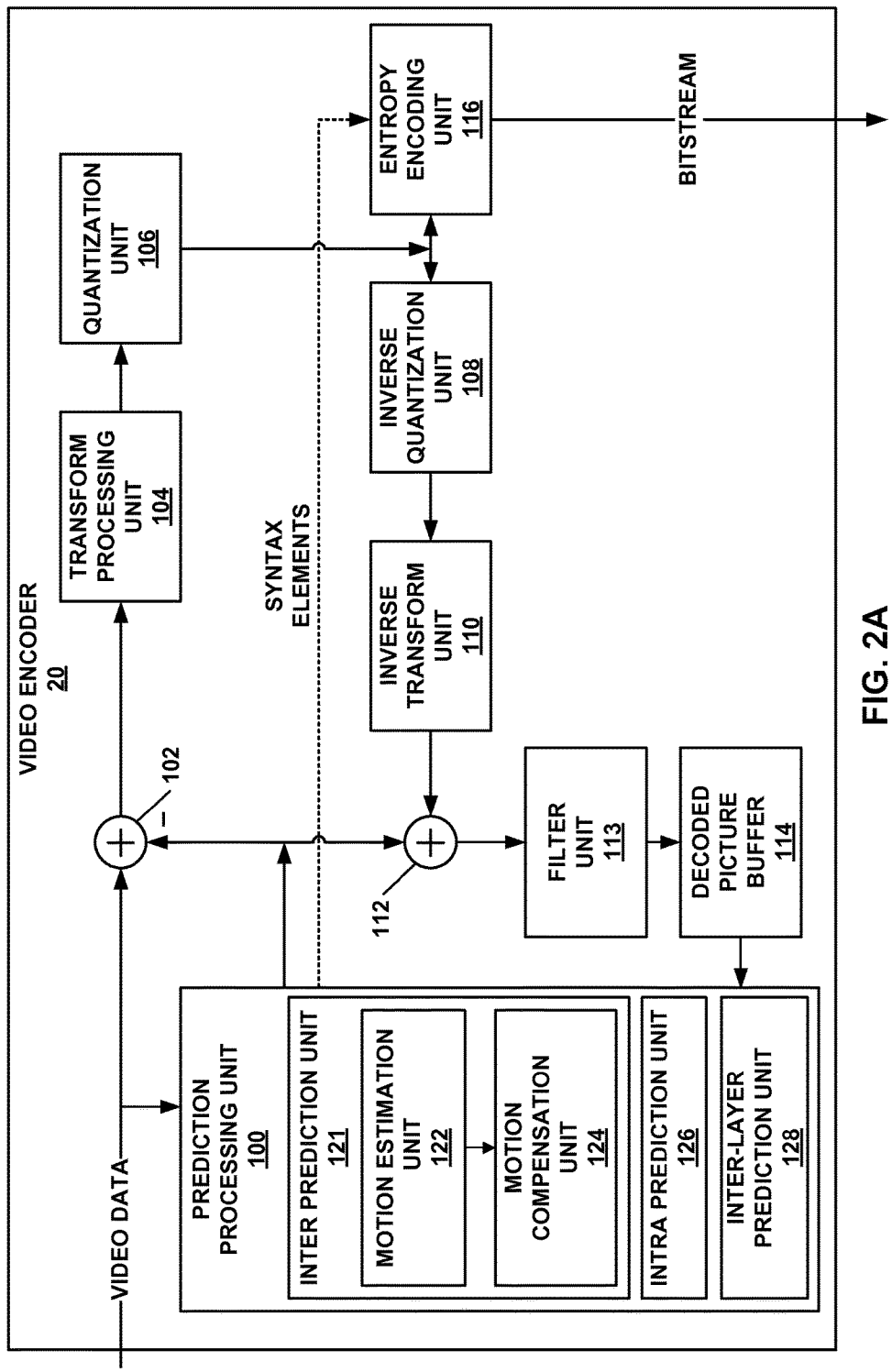
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video frame, such as for HEVC. Further, video encoder 20 may be configured to perform any or all of the techniques of this disclosure. As one example, prediction processing unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2A separately for purposes of explanation.

Video encoder 20 may receive video data. Video encoder 20 may receive the video data from various sources. For example, video encoder 20 may receive the video data from video source 18 (e.g., shown in FIG. 1A or 1B) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As further discussed below with reference to FIGS. 8-12, the prediction processing unit 100 may be configured to code (e.g., encode or decode) the PU (or any other reference layer and/or enhancement layer blocks or video units) by performing the methods illustrated in FIGS. 8-12. For example, inter prediction unit 121 (e.g., via motion estimation unit 122 and/or motion compensation unit 124), intra prediction unit 126, or inter-layer prediction unit 128 may be configured to perform the methods illustrated in FIGS. 8-12, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
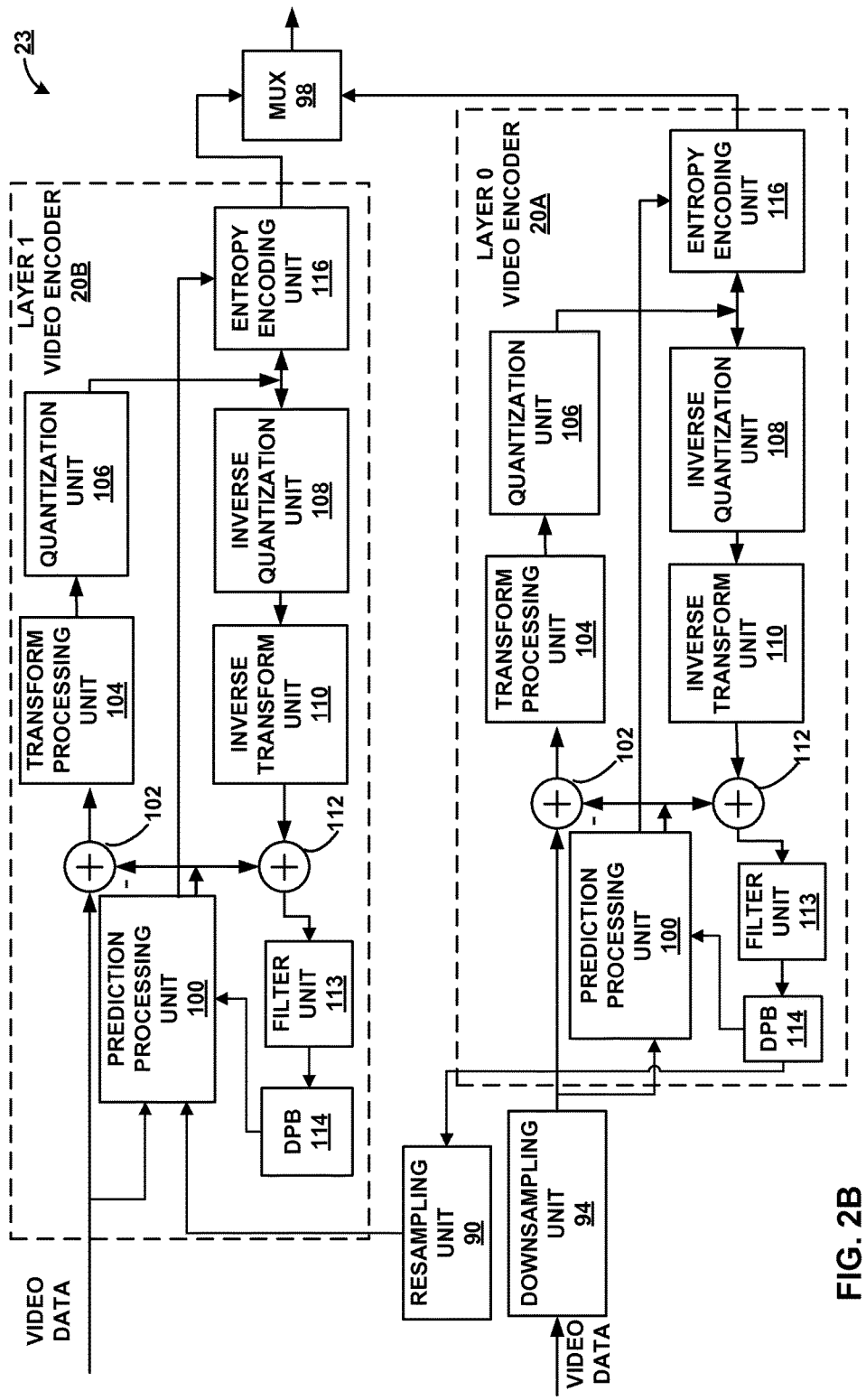
FIG. 2B is a block diagram illustrating an example of a video encoder that may implement techniques in accordance with aspects described in this disclosure.

FIG. 2B is a block diagram illustrating an example of a multi-layer video encoder 23 that may implement techniques in accordance with aspects described in this disclosure. The video encoder 23 may be configured to process multi-layer video frames, such as for SHVC and multiview coding. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor 98, or mux. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source module 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
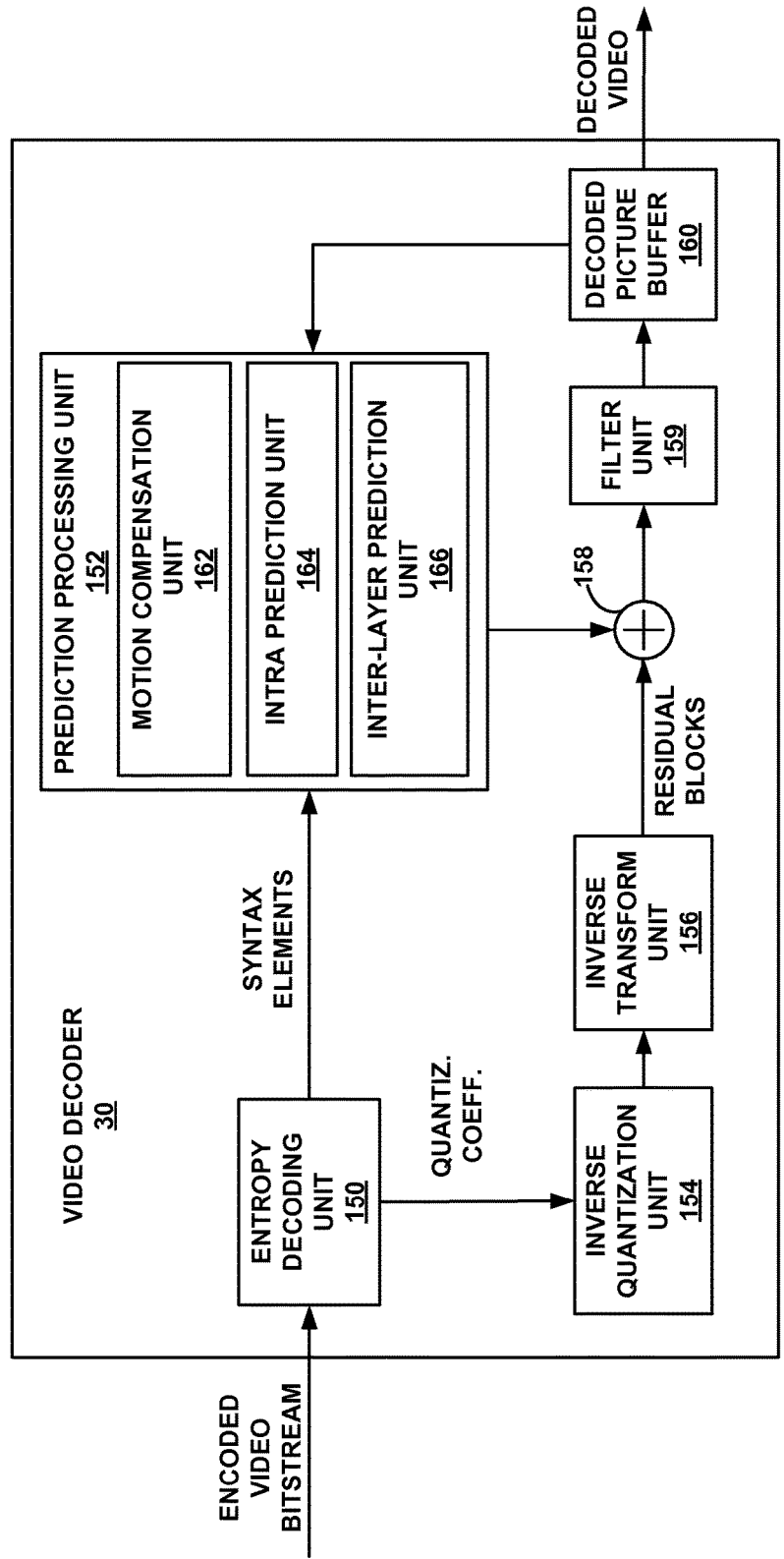
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. The video decoder 30 may be configured to process a single layer of a video frame, such as for HEVC. Further, video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, video decoder 30 includes a plurality of functional components. The functional components of video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2A. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

As further discussed below with reference to FIGS. 8-12, the prediction processing unit 152 may code (e.g., encode or decode) the PU (or any other reference layer and/or enhancement layer blocks or video units) by performing the methods illustrated in FIGS. 8-12. For example, motion compensation unit 162, intra prediction unit 164, or inter-layer prediction unit 166 may be configured to perform the methods illustrated in FIGS. 8-12, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in SVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, video decoder 30 may perform, based on the video blocks in decoded picture buffer 160, intra prediction or inter prediction operations on PUs of other CUs.

Multi-Layer Decoder

Figure 3B:
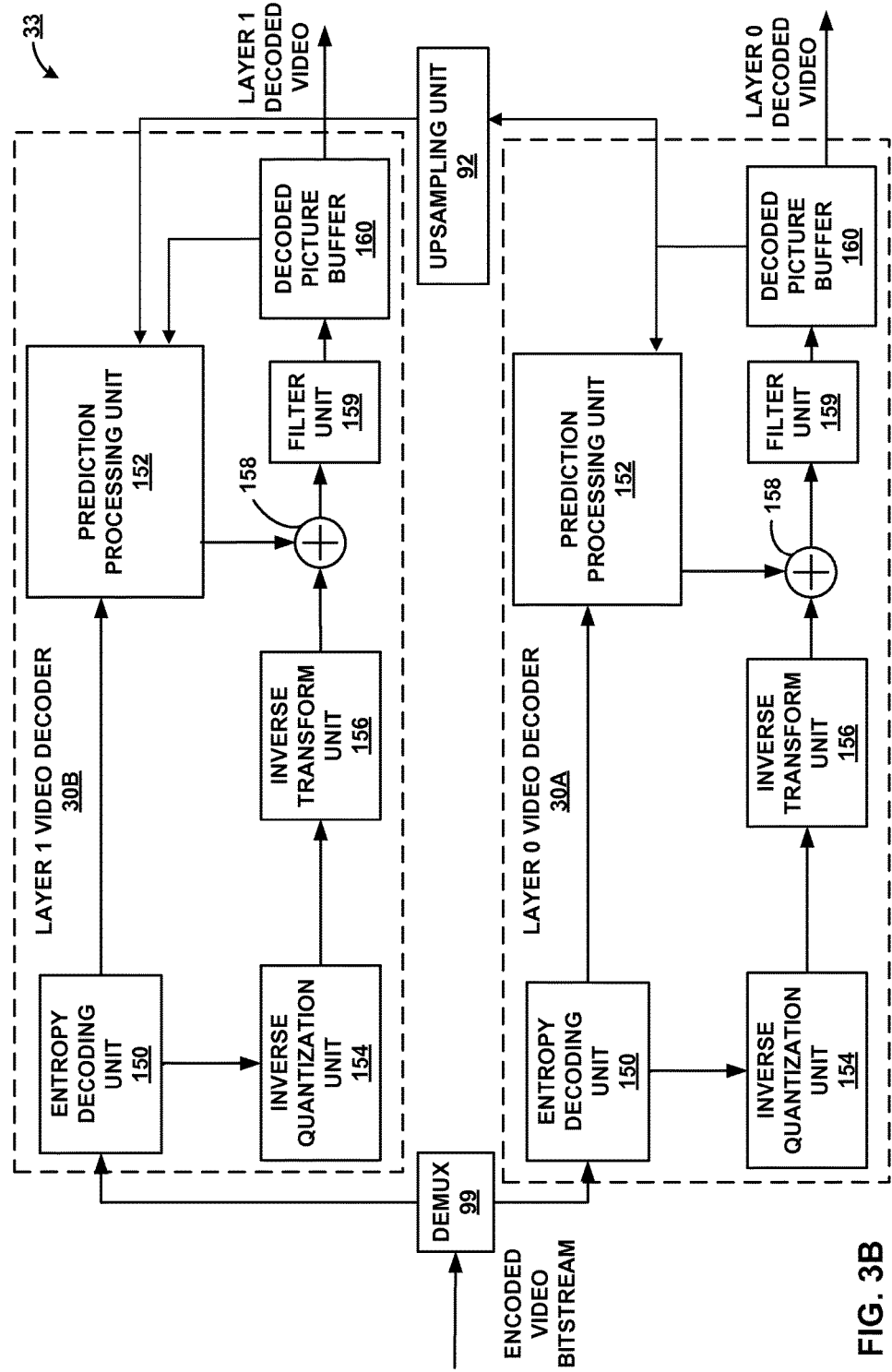
FIG. 3B is a block diagram illustrating an example of a video decoder that may implement techniques in accordance with aspects described in this disclosure.

FIG. 3B is a block diagram illustrating an example of a multi-layer video decoder 33 that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination module 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. In such video coding schemes, all pictures that follow a random access point in output order (e.g., including those pictures that are in the same access unit as the picture providing the random access point) can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc.

In some coding schemes, such random access points may be provided by pictures that are referred to as intra random access point (IRAP) pictures. For example, a random access point (e.g., provided by an enhancement layer IRAP picture) in an enhancement layer ("layerA") contained in an access unit ("auA") may provide layer-specific random access such that for each reference layer ("layerB") of layerA (e.g., a reference layer being a layer that is used to predict layerA) having a random access point contained in an access unit ("auB") that is in layerB and precedes auA in decoding order (or a random access point contained in auA), the pictures in layerA that follow auB in output order (including those pictures located in auB), are correctly decodable without needing to decode any pictures in layerA that precede auB.

IRAP pictures may be coded using intra prediction (e.g., coded without referring to other pictures), and may include, for example, instantaneous decoder refresh (IDR) pictures, clean random access (CRA) pictures, and broken link access (BLA) pictures. When there is an IDR picture in the bitstream, all the pictures that precede the IDR picture in decoding order are not used for prediction by pictures that follow the IDR picture in decoding order. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as random access skipped leading (RASL) pictures. Another type of picture that follows an IRAP picture in decoding order and precedes the IRAP picture in output order is a random access decodable leading (RADL) picture, which may not contain references to any pictures that precede the IRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., a picture having a layer ID value of 0) that is an IRAP picture may be referred to as an IRAP access unit.

Cross-Layer Alignment of IRAP Pictures

In SVC, IRAP pictures may not be required to be aligned (e.g., contained in the same access unit) across different layers. For example, if IRAP pictures were required to be aligned, any access unit containing at least one IRAP picture would only contain IRAP pictures. On the other hand, if IRAP pictures were not required to be aligned, in a single access unit, one picture (e.g., in a first layer) may be an IRAP picture, and another picture (e.g., in a second layer) may be a non-IRAP picture. Having such non-aligned IRAP pictures in a bitstream may provide some advantages. For example, in a two-layer bitstream, if there are more IRAP pictures in the base layer than in the enhancement layer, in broadcast and multicast applications, low tune-in delay and high coding efficiency can be achieved.

In some video coding schemes, a picture order count (POC) may be used to keep track of the relative order in which the decoded pictures are displayed. Some of such coding schemes may cause the POC values to be reset (e.g., set to zero or set to some value signaled in the bitstream) whenever certain types of pictures appear in the bitstream. For example, the POC values of certain IRAP pictures may be reset, causing the POC values of other pictures preceding those IRAP pictures in decoding order to also be reset. This may be problematic when the IRAP pictures are not required to be aligned across different layers. For example, when one picture ("picA") is an IRAP picture and another picture ("picB") in the same access unit is not an IRAP picture, the POC value of a picture ("picC"), which is reset due to picA being an IRAP picture, in the layer containing picA may be different from the POC value of a picture ("picD"), which is not reset, in the layer containing picB, where picC and picD are in the same access unit. This causes picC and picD to have different POC values even though they belong to the same access unit (e.g., same output time). Thus, in this example, the derivation process for deriving the POC values of picC and picD can be modified to produce POC values that are consistent with the definition of POC values and access units.

Picture Order Count (POC)

As discussed above, the value of a picture order count (POC) (e.g., PicOrderCntVal in HEVC) for a particular coded picture denotes the relative order of the particular coded picture in the picture output process with respect to other pictures in the same coded video sequence. In some embodiments, the POC comprises least significant bits (LSB) and most significant bits (MSB), and the POC may be obtained by concatenating the MSB and the LSB. In other embodiments, the POC may be obtained by adding the MSB value and the LSB value. The LSB may be signaled in the slice header, and the MSB may be computed by the encoder or the decoder based on the NAL unit type of the current picture and the MSB and LSB of one or more previous pictures in decoding order that are (1) not RASL or RADL pictures, (2) not discardable (e.g., pictures marked as "discardable," indicating that no other picture depends on them, thereby allowing them to be dropped to satisfy bandwidth constraints), (3) not sub-layer non-reference pictures (e.g., pictures that are not used for reference by other pictures in the same temporal sub-layer or the same layer), (4) has a temporal ID (e.g., temporal sub-layer ID) equal to 0. Such pictures described in (1)-(4) may be referred to herein as POC-anchor pictures. Similarly, pictures having a temporal ID value greater than 0, RASL or RADL pictures, discardable pictures, or sub-layer non-reference pictures may be referred to as non-POC-anchor pictures. POC-anchor pictures may further include pictures that an encoder and/or a decoder may not elect to remove from the bitstream (e.g., to satisfy a bandwidth constraint). POC-anchor pictures may further include any picture other than the types of pictures that an encoder and/or a decoder may be configured to remove from the bitstream (e.g., to satisfy a bandwidth constraint). Non-POC-anchor pictures may include any picture that is not a POC-anchor picture.

When the current picture is (1) an IRAP picture with NoRaslOutputFlag (e.g., a flag that indicates that RASL pictures are not to be output if set to 1 and indicates that RASL pictures are to be output if set to 0) equal to 1, or (2) a CRA picture that is the first picture of the bitstream, the value of POC MSB is inferred to be equal to 0. As described above, in a multi-layer bitstream (e.g., SHVC or MV-HEVC bitstream with more than one layer), there may exist access units (AU) where one or more pictures are IRAP pictures and one or more other pictures are non-IRAP pictures, and such AUs may be referred to as "non-aligned IRAP AUs." When decoding bitstreams containing non-aligned IRAP AUs, it is possible (and likely) that the POCs derived based on the POC LSB values signaled in the bitstream would violate the bitstream conformance requirement that all pictures in an access unit should have the same POC value.

In some embodiments, a POC reset flag (e.g., poc_reset_flag) may be used to reset the POC of the pictures such that even when non-aligned IRAP AUs are present in the bitstream, the POC value of the current picture and the pictures in the DPB are adjusted such that the POC of all the pictures in an AU are the same.

In some embodiments, instead of a single POC reset flag, two flags may be used: a POC MSB reset flag (e.g., poc_msb_reset_flag) and a POC LSB reset flag (e.g., poc_lsb_reset_flag). The former (i.e., the poc_msb_reset_flag) resets the MSB of the POC, and the latter (i.e., the poc_lsb_reset_flag) resets the LSB of the POC. Both of these flags may be signaled in the slice header.

For example, if a particular picture has a POC value of 233, and the MSB and the LSB of the POC constitute 1 bit and 7 bits, respectively, the MSB would be "1" (e.g., having a value of 128) and the LSB would be "1101001" (e.g., having a value of 105). Thus, if only the MSB of the POC is reset (e.g., in response to processing poc_msb_reset_flag having a value of 1), the POC value becomes 105, and if only the LSB are reset (e.g., in response to processing poc_lsb_reset_flag having a value of 1), the POC value becomes 128. If both the MSB and the LSB are reset (e.g., in response to processing poc_msb_reset_flag and poc_lsb_reset_flag, each having a value of 1), the POC value becomes 0.

Resetting of POC Values

With reference to FIGS. 4-7, the motivation for resetting the POC values (e.g., the LSB and the MSB) in non-aligned IRAP AUs will be described. As described above, in some coding schemes, certain conformance constraints may specify that the POC of all coded pictures in a single AU should be the same. Without appropriate resets of the POC values, non-aligned IRAP AUs in the bitstream may produce POC values that violate such conformance constraints.

Figures 4, 5:
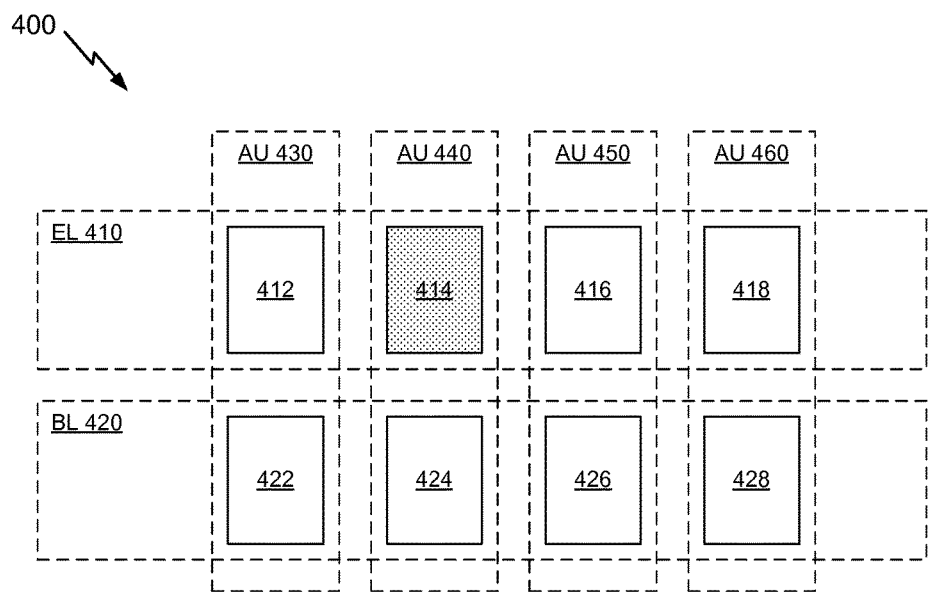
FIG. 4 is a block diagram illustrating an example configuration of pictures in different layers, according to one embodiment of the present disclosure.
FIG. 5 is a table illustrating POC values of pictures in different layers, according to one embodiment of the present disclosure.

FIG. 4 shows a multi-layer bitstream 400 including an enhancement layer (EL) 410 and a base layer (BL) 420. The EL 410 includes EL pictures 412-418, and the BL includes BL pictures 422-428. The multi-layer bitstream 400 further includes access units (AUs) 430-460. The AU 430 includes the EL picture 412 and the BL picture 422, the AU 440 includes the EL picture 414 and the BL picture 424, the AU 450 includes the EL picture 416 and the BL picture 426, and the AU 460 includes the EL picture 418 and the BL picture 428. In the example of FIG. 4, the EL picture 414 is an IDR picture, and the corresponding BL picture 424 in the AU 440 is a trailing picture (e.g., a non-IRAP picture), and consequently, the AU 440 is a non-aligned IRAP AU. In some embodiments, an MSB reset is performed at a given picture if the picture is an IDR picture that is not in the base layer. Such an IDR picture may have a non-zero POC LSB value.

FIG. 5 shows a table 500 that illustrates the POC values that may be signaled or derived in connection with the multi-layer bitstream 400 of FIG. 4. As shown in FIG. 5, the MSB of the POC in the EL 410 is reset at the EL picture 414, while the MSB of the POC in the BL 420 is not reset. Thus, if a reset is not performed in the BL 420 at the BL picture 424 in the non-aligned IRAP AU 440, the POC values of BL pictures and the EL pictures in the AUs 440-460 would not match (i.e., be equivalent) as specified by the conformance constraints. The differences in the POC values with and without a reset are highlighted in bold in FIG. 5.

Figures 6, 7:
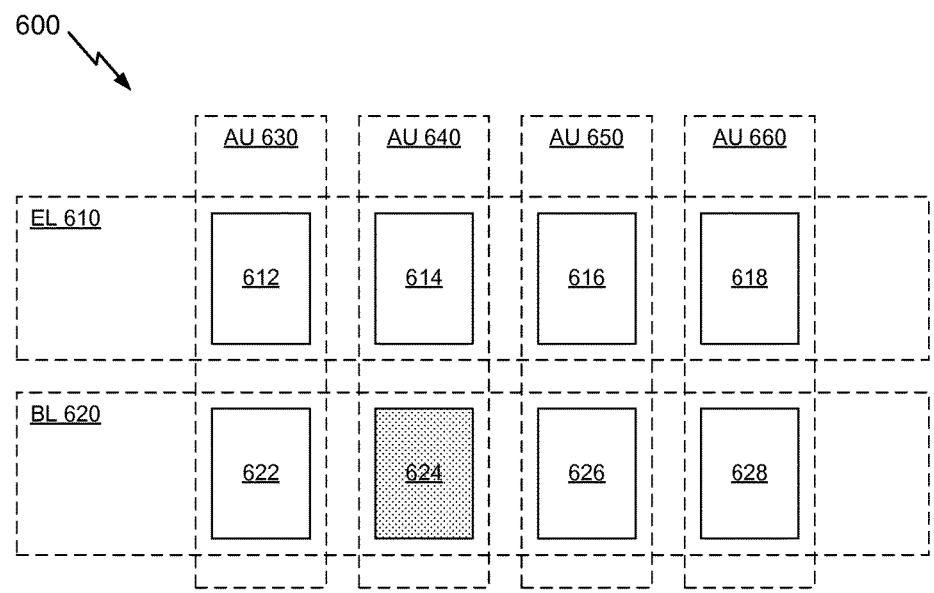
FIG. 6 is a block diagram illustrating an example configuration of pictures in different layers, according to one embodiment of the present disclosure.
FIG. 7 is a table illustrating POC values of pictures in different layers, according to one embodiment of the present disclosure.

FIG. 6 shows a multi-layer bitstream 600 including an enhancement layer (EL) 610 and a base layer (BL) 620. The EL 610 includes EL pictures 612-618, and the BL includes BL pictures 622-628. The multi-layer bitstream 600 further includes access units (AUs) 630-660. The AU 630 includes the EL picture 612 and the BL picture 622, the AU 640 includes the EL picture 614 and the BL picture 624, the AU 650 includes the EL picture 616 and the BL picture 626, and the AU 660 includes the EL picture 618 and the BL picture 628. In the example of FIG. 6, the BL picture 624 is an IDR picture, and the corresponding EL picture 614 in the AU 640 is a trailing picture (e.g., a non-IRAP picture), and consequently, the AU 640 is a non-aligned IRAP AU. In some embodiments, an MSB reset and an LSB reset are performed for a given picture if the picture is an IDR picture that is in the base layer. For example, the bitstream may include an indication that the POC MSB and the POC LSB of such a BL IDR picture should be reset. Alternatively, the decoder may perform the reset of the POC MSB and the POC LSB of such a BL IDR picture without any indication in the bitstream that a POC reset should be performed.

FIG. 7 shows a table 700 that illustrates the POC values that may be signaled or derived in connection with the multi-layer bitstream 600 of FIG. 6. As shown in FIG. 7, the MSB and the LSB of the POC in the BL 620 is reset at the BL picture 624, while neither the MSB nor the LSB of the POC in the EL 610 is reset. Thus, if a reset of the MSB and the LSB of the POC is not performed in the EL 610 at the EL picture 614 in the non-aligned IRAP AU 640, the POC values of BL pictures and the EL pictures in the AUs 640-660 would not match as specified by the conformance constraints. The differences in the POC values with and without a reset are highlighted in bold in FIG. 7.

The embodiments described herein are not limited to the example bitstream configurations illustrated in FIGS. 4 and 6, and the techniques described herein may be extended to any multi-layer bitstream having any number of layers, access units, and pictures. Also, in the examples illustrated in FIGS. 4-7, the LSB of the POC is represented using seven bits. However, the techniques described herein may be extended to scenarios having any forms of POC value representation.

Reset of Preceding Pictures and Loss of Reset Pictures

When an MSB reset or an LSB reset is performed at a particular picture, other pictures in the same layer that precede the particular picture in decoding order are also reset based on the reset performed at the particular picture. For example, in the example of FIG. 6, the EL picture 614 has a POC value of 241 (e.g., LSB of "1110001"+MSB of "1", which is 113+128). When the MSB and LSB resets are performed at the EL picture 614, the POC value of the EL picture 614 becomes 0, and the EL picture 612 in the EL 610 which precedes the EL picture 614 in decoding order is also reset based on the original POC value of 241 of the EL picture 614. For example, the new POC value of the EL picture 612 is calculated by subtracting the pre-reset POC value of the EL picture 614 (which is a value of 241) from the pre-reset POC value of the EL picture 612, which is 240 (e.g., LSB of "1110000"+MSB of "1", which is 112+128). Thus, after the reset, the POC value of the EL picture 612 becomes −1, in accordance with the fact that the EL picture 612 is to be output before the EL picture 614, where a smaller POC value denotes an earlier position in output order. As shown in FIG. 7, the signaled LSB values for the subsequent AUs 650 and 660 are adjusted accordingly (e.g., to 1 and 2, respectively), with the assumption that the reset is performed at the EL picture 614.

However, even if an appropriate POC reset of the MSB and/or the LSB described above is signaled in the bitstream (e.g., in the slice header) so that the decoder can process the signal and perform the POC reset accordingly, if the picture signaling such a POC reset is lost during transmission of the bitstream or removed from the bitstream in order to satisfy bandwidth constraints, the POC reset intended to be performed at the particular picture may not be properly performed.

For example, in the example of FIG. 6, if the EL picture 614 is unavailable to the decoder, the decoder would not know (i.e., would not determine) to reset the MSB and LSB of the POC in the EL 610 at the AU 640. Consequently, the POC values of the any pictures preceding the unavailable EL picture 614 in decoding order would still have their original, pre-reset POC values since the reset at the EL picture 614 never took place (i.e., the reset operation was not performed). On the other hand, the POC values of the pictures following the unavailable EL picture 614 in decoding order would have been determined or signaled as if reset actually took place (i.e., the reset operation was performed). Thus, in the example of FIG. 7, the EL pictures 612, 616, and 618 would have POC values of 240, 1, and 2, respectively, which would be incorrect given that the EL picture 612 precedes the EL pictures 616 and 618 in output order. Thus, a coding method that results in correct POC values, even when the picture signaling the POC reset becomes unavailable, is desired.

Examples and Implementations

Several methods that may be used to address certain problems described above will be described below. Some of these methods may be applied independently, and some of them may be applied in combination. In addition, the example syntax and semantics that may be used to implement one or more of the methods described herein are also provided below. When certain portions of the HEVC specification are reproduced to illustrate the additions and deletions that may be incorporated to implement one or more of the methods described herein, such modifications are shown in italics and strikethrough, respectively.

Signaling Values for POC Derivation

In some embodiments, an SEI message that contains information for correct POC derivation is signaled for one or more pictures that follow the picture for which the POC MSB and/or the POC LSB is to be reset. For example, the SEI message may be associated with a picture, picA, that follows another picture, picB, for which the POC MSB, the POC LSB, or both are to be reset. Thus, even when picB is entirely lost, the SEI message associated with picA can be used to derive the correct POC values for other pictures in the same layer.

In some embodiments, the information for correct POC derivation is signaled in the slice header of one or more pictures that follow the picture for which the POC MSB and/or the POC LSB is to be reset. For example, the information may be included in the slice header of a picture picA that follows another picture picB for which the POC MSB, the POC LSB, or both are to be reset. Thus, even when picB is entirely lost, the information included in the slice header of picA can be used to derive the correct POC values for other pictures in the same layer.

Derivation of Correct POC Based on Signaled Values

Figure 8:
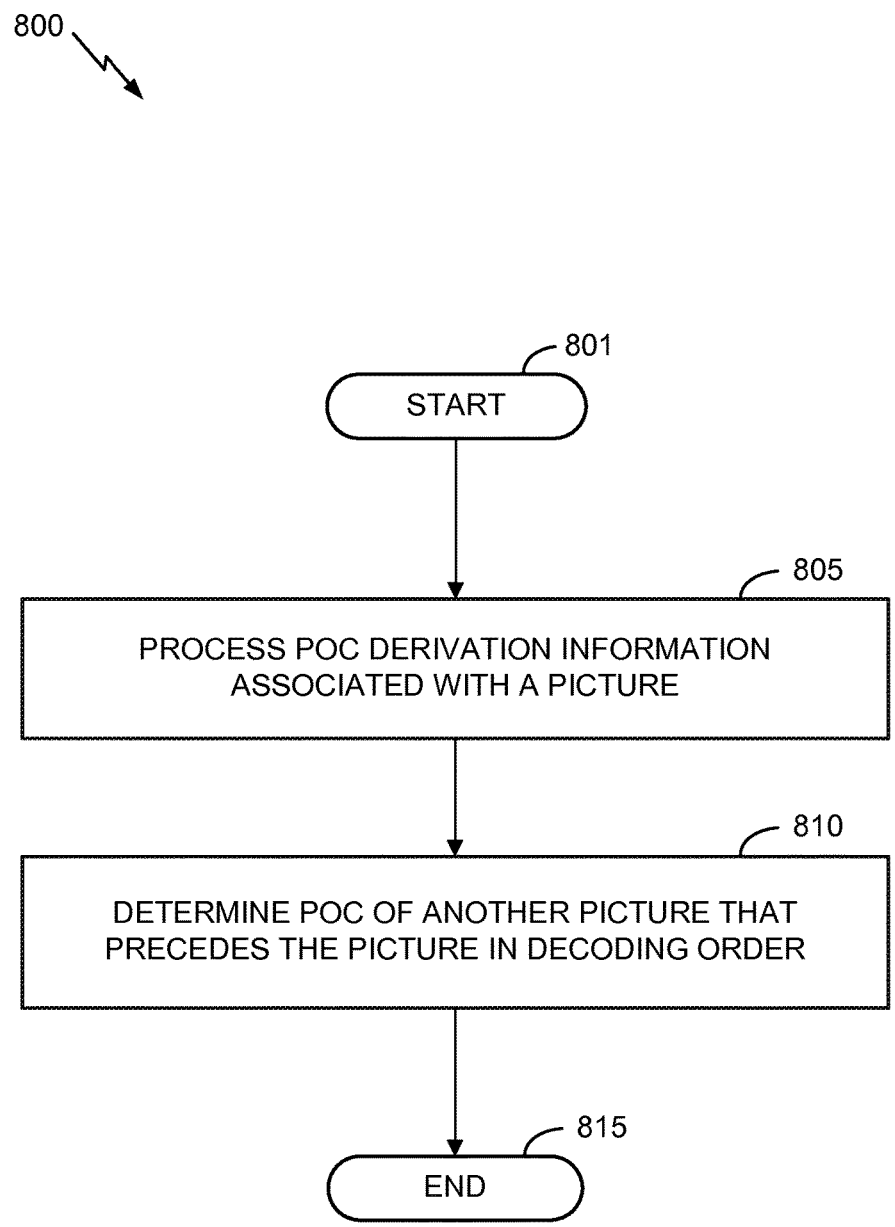
FIG. 8 is a flow chart illustrating a method of coding video information, according to one embodiment of the present disclosure.

FIG. 8 is a flowchart illustrating a method 800 for coding video information, according to an embodiment of the present disclosure. The steps illustrated in FIG. 8 may be performed by an encoder (e.g., the video encoder as shown in FIG. 2A or FIG. 2B), a decoder (e.g., the video decoder as shown in FIG. 3A or FIG. 3B), or any other component. For convenience, method 800 is described as performed by a coder, which may be the encoder, the decoder, or another component.

The method 800 begins at block 801. At block 805, the coder processes POC derivation information associated with a picture. In some embodiments, the processing of the POC derivation information may include signaling the POC derivation information in a bitstream. As described above, the POC derivation information may be signaled in the slice header of the picture and/or signaled as an SEI message associated with the picture. In some embodiments, the processing of the POC derivation information may include processing the POC derivation information included in a bitstream. For example, the POC derivation information may include: a POC reset type indicating whether the POC value of the preceding POC-reset picture (e.g., a picture at which a POC reset is to be performed) in the same layer is to be reset by resetting both most significant bits (MSB) and least significant bits (LSB) of the POC value or by resetting only the MSB of the POC value; a POC reset value indicating the POC value of the picture that was lost or removed that also precedes the picture with which the POC derivation information is associated; and a POC reset ID identifying the POC reset for which the POC derivation information is provided. For example, the decoder may skip a POC reset signaled in connection with a particular picture if the signaled POC reset has a POC reset ID value of 1 and another POC reset having a POC reset ID of 1 has already been performed.

At block 810, the coder determines the POC of another picture that precedes the picture in decoding order. In the example shown in FIG. 7, even if the EL picture 614 containing the POC value reset instruction is lost or otherwise removed, the POC value of the EL picture 612 would be correctly reset using the POC derivation information, for example, associated with the EL pictures 616 and/or 618. The method 800 ends at 815.

As discussed above, one or more components of video encoder 20 of FIG. 2A, video encoder 23 of FIG. 2B, video decoder 30 of FIG. 3A, or video decoder 33 of FIG. 3B (e.g., inter-layer prediction unit 128 and/or inter-layer prediction unit 166) may be used to implement any of the techniques discussed in the present disclosure, such as processing the POC derivation information associated with one or more pictures, and determining the POC of another picture that precedes the one or more pictures in decoding order.

Disabling POC Reset in Non-POC-Anchor Pictures

In some embodiments, a conformance constraint may be applied (e.g., a conformance constraint may be determined to be applicable and then adhered to based on the performance of operation(s)), for example by a coder, to the bitstream such that the value of neither poc_lsb_reset_flag nor poc_msb_reset_flag is set equal to 1 when the slice segment belongs to a picture that is not a POC-anchor picture. As described above, such a picture may be a sub-layer non-reference picture, a discardable picture, a RASL picture, a RADL picture, or a picture that has a temporal ID greater than 0. For example, the sub-layer non-reference picture may refer to a picture that is not used for reference by other pictures of the highest temporal layer. The discardable picture may refer to a picture that is not used for reference by any other picture. For example, such discardable pictures may be marked "discardable." Such discardable pictures may be removed from the bitstream by the encoder or the decoder in order to satisfy bandwidth constraints. In some embodiments, a discardable picture includes any picture that may be removed from the bitstream by choice (e.g., by the decoder or some middlebox). The RASL and RADL pictures refer to leading pictures, and RASL pictures may not be output if the decoding process starts at the IRAP picture associated with the RASL picture. The picture having a temporal ID greater than 0 may be a picture that may be removed from the bitstream if the frame rate is switched down to a sufficiently low value. For example, if a bitstream contains three temporal sub-layers, the pictures from all three temporal sub-layers may be displayed in order to operate at 90 frames per second (fps), the pictures from the lower two temporal sub-layers may be displayed in order to operate at 60 fps, and the pictures from the lowest temporal sub-layer may be displayed in order to operate at 30 fps. As discussed above, bitstream constraints or other performance constraints may cause one or more pictures to be removed or dropped from the bitstream (e.g., a coder may evaluate such constraints and, based on this evaluation, perform operations in accordance with the constraints such that one or more pictures are caused to be removed from the bitstream or dropped from the bitstream), and in this example, the pictures from the highest temporal sub-layer may be removed before removing pictures from the next highest temporal sub-layer, and so on. For example, the pictures in the lowest temporal sub-layer may not be removed from the bitstream until the pictures in all the other temporal sub-layers are removed. Thus, pictures having a temporal ID greater than 0 (where a temporal ID of 0 corresponds to the lowest temporal sub-layer) are more likely to be removed from the bitstream.

As described herein, these pictures (e.g., a sub-layer non-reference picture, a discardable picture, a RASL picture, a RADL picture, a picture that has a temporal ID greater than 0, and the like) may be referred to as non-POC-anchor pictures. In some embodiments, because these pictures are more likely to be removed from the bitstream (e.g., to satisfy certain bandwidth constraints), a constraint that specifies that these pictures cannot trigger a POC reset may be introduced to reduce the likelihood that a POC-reset picture may be removed from the bitstream. For example, if a discardable picture is not allowed to trigger a POC reset (e.g., by signaling a POC MSB reset, a POC LSB reset, or both), even if the discardable picture is discarded, the unavailability of that discardable picture to the decoder would not result in the problems described above regarding POC resets.

In some embodiments, the coder may determine that a POC reset should be signaled in connection with a particular picture, subsequently determine that the particular picture is a sub-layer non-reference picture, a discardable picture, a RASL picture, a RADL picture, a picture that has a temporal ID greater than 0, or a picture that is otherwise likely to be removed from the bitstream, and thus refrain from signaling a POC reset in the particular picture or signal that a POC reset is not to be performed at the particular picture. In some embodiments, the coder may determine that a POC reset should be signaled in connection with a particular picture, and subsequently prevent the particular picture from being a non-POC-anchor picture (e.g., by preventing the particular picture from having certain picture types). In some embodiments, the determination of whether a POC reset should be performed at the particular picture may be based at least in part on whether the particular picture is a sub-layer non-reference picture, a discardable picture, a RASL picture, a RADL picture, a picture that has a temporal ID greater than 0, or a picture that is otherwise likely to be removed from the bitstream. In such embodiments, if the particular picture is not a POC-anchor picture, the coder indicates in the bitstream that the POC reset is not to be performed at the particular picture. Alternatively, the coder may simply not provide any indication in the bitstream that a POC reset is to be performed at the particular picture. Similarly, if the particular picture is a POC-anchor picture, the coder, if a POC reset is determined to be needed at the particular picture, indicate in the bitstream that the POC reset is to be performed at the particular picture. Alternatively, the coder may simply not provide any indication in the bitstream that the POC reset is not to be performed or that the POC reset should not be performed at the particular picture.

Disabling of POC Reset in Non-POC-Anchor Pictures

Figure 9:
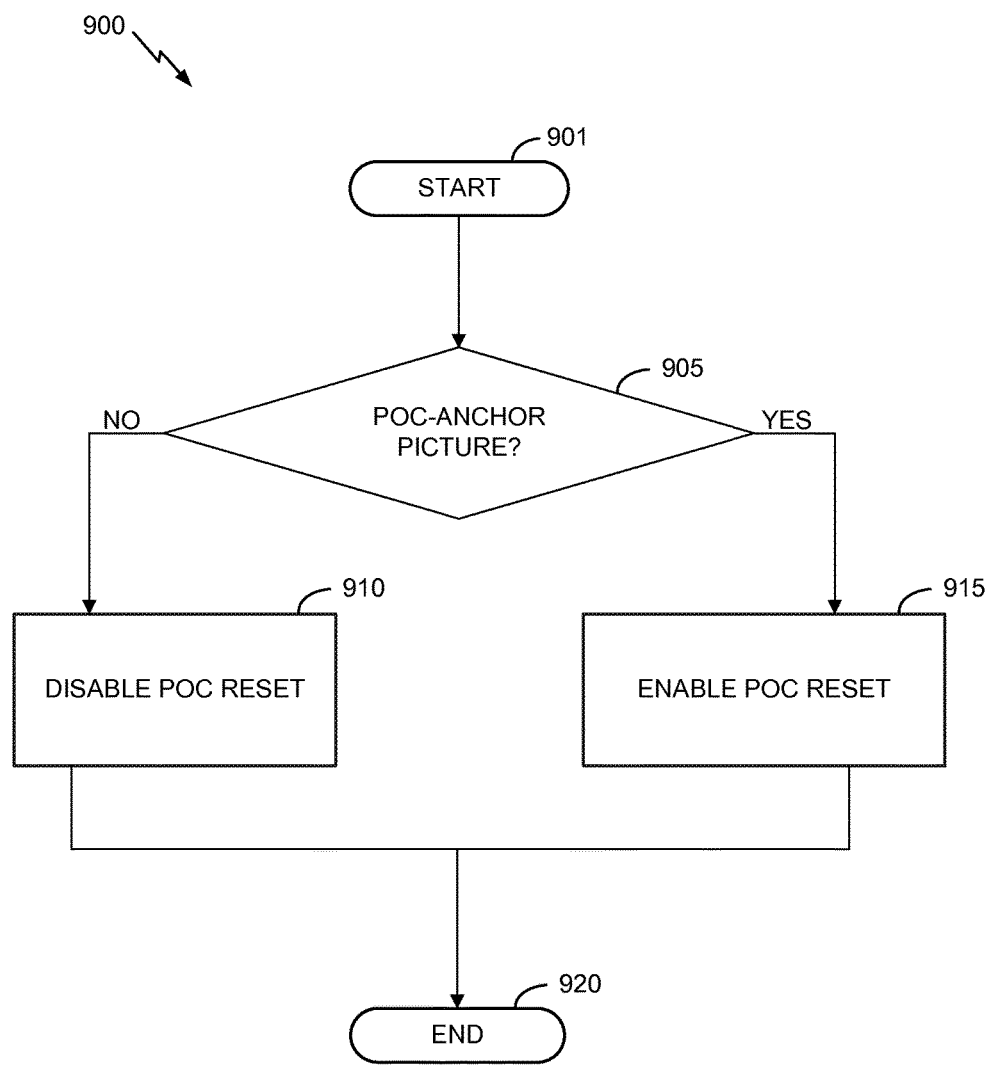
FIG. 9 is a flow chart illustrating a method of coding video information, according to one embodiment of the present disclosure.

FIG. 9 is a flowchart illustrating a method 900 for coding video information, according to an embodiment of the present disclosure. The steps illustrated in FIG. 9 may be performed by an encoder (e.g., the video encoder as shown in FIG. 2A or FIG. 2B), a decoder (e.g., the video decoder as shown in FIG. 3A or FIG. 3B), or any other component. For convenience, method 900 is described as performed by a coder, which may be the encoder, the decoder, or another component.

The method 900 begins at block 901. At block 905, the coder determines whether a picture is a POC-anchor picture. For example, POC-anchor pictures may include any pictures that are: (1) not RASL or RADL pictures, (2) not discardable (e.g., pictures marked as "discardable," indicating that no other picture depends on them, thereby allowing them to be dropped to satisfy bandwidth constraints), (3) not sub-layer non-reference pictures (e.g., pictures that are not used for reference by other pictures in higher temporal layers), (4) has a temporal ID (e.g., temporal sub-layer ID) equal to 0, and/or (5) any other picture that is otherwise likely to be removed from the bitstream. If the coder determines that the picture is not a POC-anchor picture, the method 900 proceeds to 910. On the other hand, if the coder determines that the picture is a POC-anchor picture, the method 900 proceeds to 915.

At block 910, the coder signals for the picture that the POC reset is not to be performed at the picture. For example, the coder may signal one or more flags that indicate that neither the POC LSB reset nor the POC MSB reset is to be performed in connection with the picture. In some embodiments, the coder may not signal or otherwise provide any indication in the bitstream that a POC reset is to be performed at the picture. For example, during the decoding process, if no signal or indication that indicates that a POC reset is to be performed is provided in the bitstream, the decoder may not perform a POC reset at that picture.

At block 915, the coder signals a POC reset for the picture. For example, the coder may signal one or more flags in the bitstream that indicate that a POC LSB reset, a POC MSB reset, or both are to be performed. In some embodiments, the coder may not signal or otherwise provide any indication in the bitstream that a POC reset is not to be performed at the picture. For example, during the decoding process, the decoder may infer or determine from other signals or indications in the bitstream that a POC reset is to be performed, and that if no additional signal or indication disabling the POC reset is provided in the bitstream, the decoder should perform the POC reset as inferred or determined. The method 900 ends at 920.

As discussed above, one or more components of video encoder 20 of FIG. 2A, video encoder 23 of FIG. 2B, video decoder 30 of FIG. 3A, or video decoder 33 of FIG. 3B (e.g., inter-layer prediction unit 128 and/or inter-layer prediction unit 166) may be used to implement any of the techniques discussed in the present disclosure, such as determining whether a picture is a POC-anchor picture, enabling a POC reset, disabling a POC reset, providing an indication in the bitstream that a POC reset is to be performed, and providing an indication in the bitstream that a POC reset is not to be performed.

In the method 900, one or more of the blocks shown in FIG. 9 may be removed (e.g., not performed) and/or the order in which the method is performed may be switched. For example, although block 910 is shown in FIG. 9, block 910 may be removed, and the method 900 may end without performing any additional operations if the coder determines that the picture is not a POC-anchor picture. Alternatively, block 915 may be removed, and the method 900 may end without performing any additional operations if the coder determines that the picture is a POC-anchor picture. Thus, the embodiments of the present disclosure are not limited to or by the example shown in FIG. 9, and other variations may be implemented without departing from the spirit of this disclosure.

IRAP Pictures in Non-Aligned IRAP AU

In some embodiments, a conformance constraint may be applied to the bitstream such that when an access unit contains at least one picture that is an IRAP picture with NoRaslOutputFlag equal to 1, a POC MSB (e.g., MSB of the POC) reset shall be performed for all pictures in the access unit that are not IRAP pictures. In such embodiments, poc_msb_reset_flag associated with the non-IRAP pictures may be set to 1 (e.g., indicating that a POC MSB reset is to be performed at such non-IRAP pictures). For example, if Picture A is an IRAP picture in an access unit that immediately follows a splice point (e.g., indicated by NoRaslOutputFlag value of 1), and Picture B that is in the same access unit as Picture A is a non-IRAP picture, a POC MSB reset may be signaled in the bitstream for Picture B.

Figure 10:
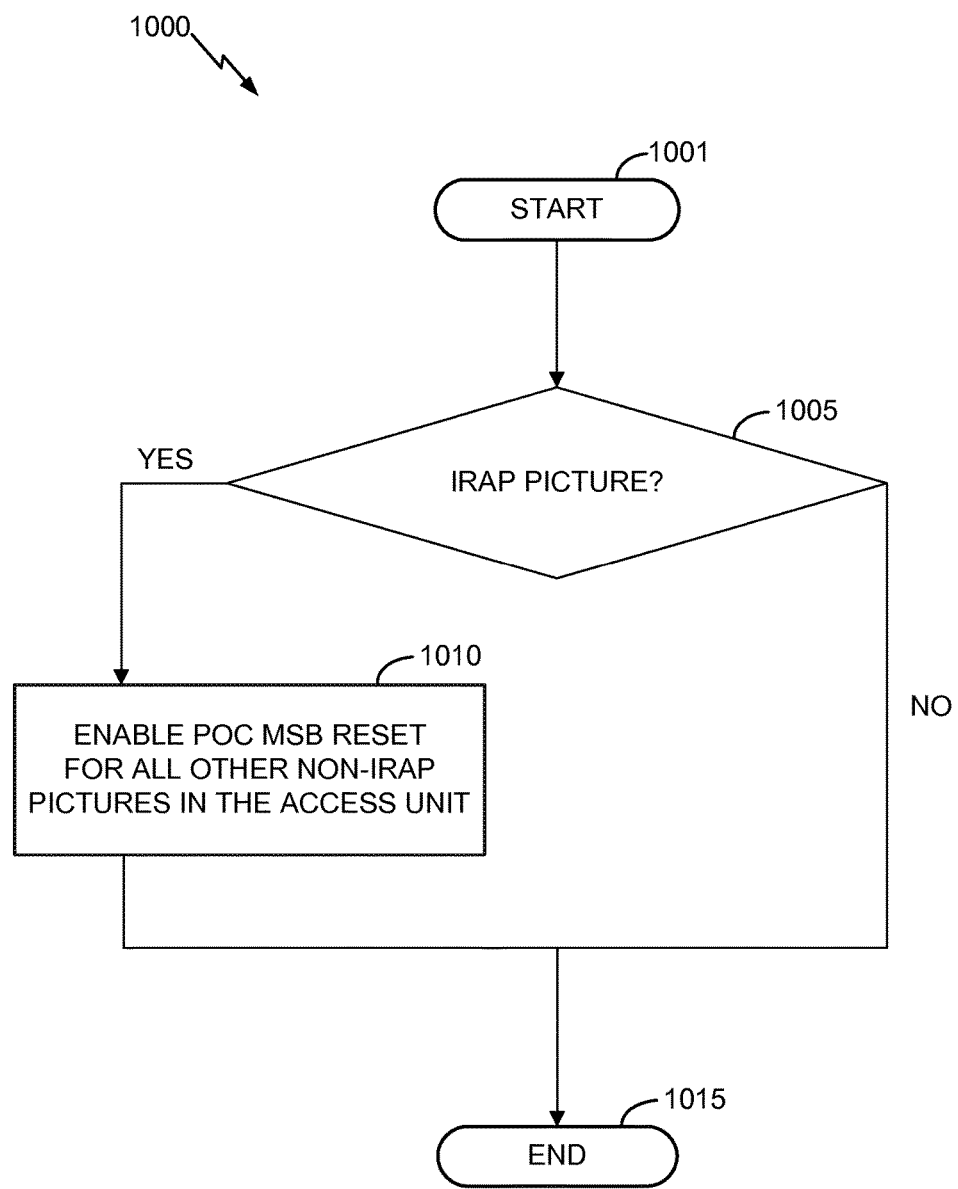
FIG. 10 is a flow chart illustrating a method of coding video information, according to one embodiment of the present disclosure.

FIG. 10 is a flowchart illustrating a method 1000 for coding video information, according to an embodiment of the present disclosure. The steps illustrated in FIG. 10 may be performed by an encoder (e.g., the video encoder as shown in FIG. 2A or FIG. 2B), a decoder (e.g., the video decoder as shown in FIG. 3A or FIG. 3B), or any other component. For convenience, method 1000 is described as performed by a coder, which may be the encoder, the decoder, or another component.

The method 1000 begins at block 1001. At block 1005, the coder determines whether a picture is an IRAP picture. As described above, in some embodiments, an IRAP picture may be an IDR picture, a CRA picture, or a BLA picture. In some embodiments, the coder may further determine, based on information included in the bitstream, whether the picture is in an access unit that immediately follows a splice point. In some embodiments, the coder may further determine, instead of determining whether the picture is in an access unit that immediately follows a splice point, whether pictures preceding the picture in decoding order should be output. For example, whether the picture is in an access unit that immediately follows a splice point or whether pictures preceding the picture in decoding order should be output may be indicated by one or more variables that are signaled or indicated in the bitstream or derived from other information available to the coder (e.g., NoRaslOutputFlag). For example, for IDR pictures and CRA pictures, NoRaslOutputFlag may be derived from other information included in the bitstream. For BLA pictures, the presence of such BLA pictures may indicate to the decoder that the BLA pictures immediately follow a splice point. If the coder determines that the picture is an IRAP picture, the method 1000 proceeds to block 1010. Otherwise, the method 1000 ends at 1015.

At block 1010, the coder enables a POC MSB reset for all other non-IRAP pictures in the access unit. In some embodiments, the coder enables a POC MSB reset for all other non-IRAP pictures in the access unit that immediately follow a splice point in decoding order. For example, the coder may signal a POC MSB reset flag (e.g., poc_msb_reset_flag) having a value of 1, indicating that a POC MSB reset is to be performed for each of the non-IRAP pictures. The method 1000 ends at 1015.

As discussed above, one or more components of video encoder 20 of FIG. 2A, video encoder 23 of FIG. 2B, video decoder 30 of FIG. 3A, or video decoder 33 of FIG. 3B (e.g., inter-layer prediction unit 128 and/or inter-layer prediction unit 166) may be used to implement any of the techniques discussed in the present disclosure, such as determining whether a picture is an IRAP picture, and enabling a POC MSB reset for all other non-IRAP pictures in the access unit.

In the method 1000, one or more of the blocks shown in FIG. 10 may be removed (e.g., not performed) and/or the order in which the method is performed may be switched. Thus, the embodiments of the present disclosure are not limited to or by the example shown in FIG. 10, and other variations may be implemented without departing from the spirit of this disclosure.

Base Layer IDR Pictures in Non-Aligned IRAP AU

In some embodiments, a conformance constraint may be applied to the bitstream such that when an access unit A contains a base layer picture that is an IDR picture, a POC LSB (e.g., LSB of the POC) reset shall be performed for all enhancement layer pictures in the access unit A that are not IDR pictures or that have a non-zero POC LSB value signaled in the bitstream. In such embodiments, the poc_lsb_reset_flag associated with the EL pictures (e.g., indicating that a POC LSB reset is to be performed at such EL pictures). For example, if Picture A in the base layer is an IDR picture, and Picture B that is in the same access unit as Picture A is not an IDR picture, a POC LSB reset may be signaled in the bitstream for Picture B. In another example, if Picture A in the base layer is an IDR picture, and Picture C in the same access unit as Picture A has a POC LSB value of 0 signaled in the bitstream, a POC LSB reset may not need to be signaled in the bitstream for Picture C.

Figure 11:
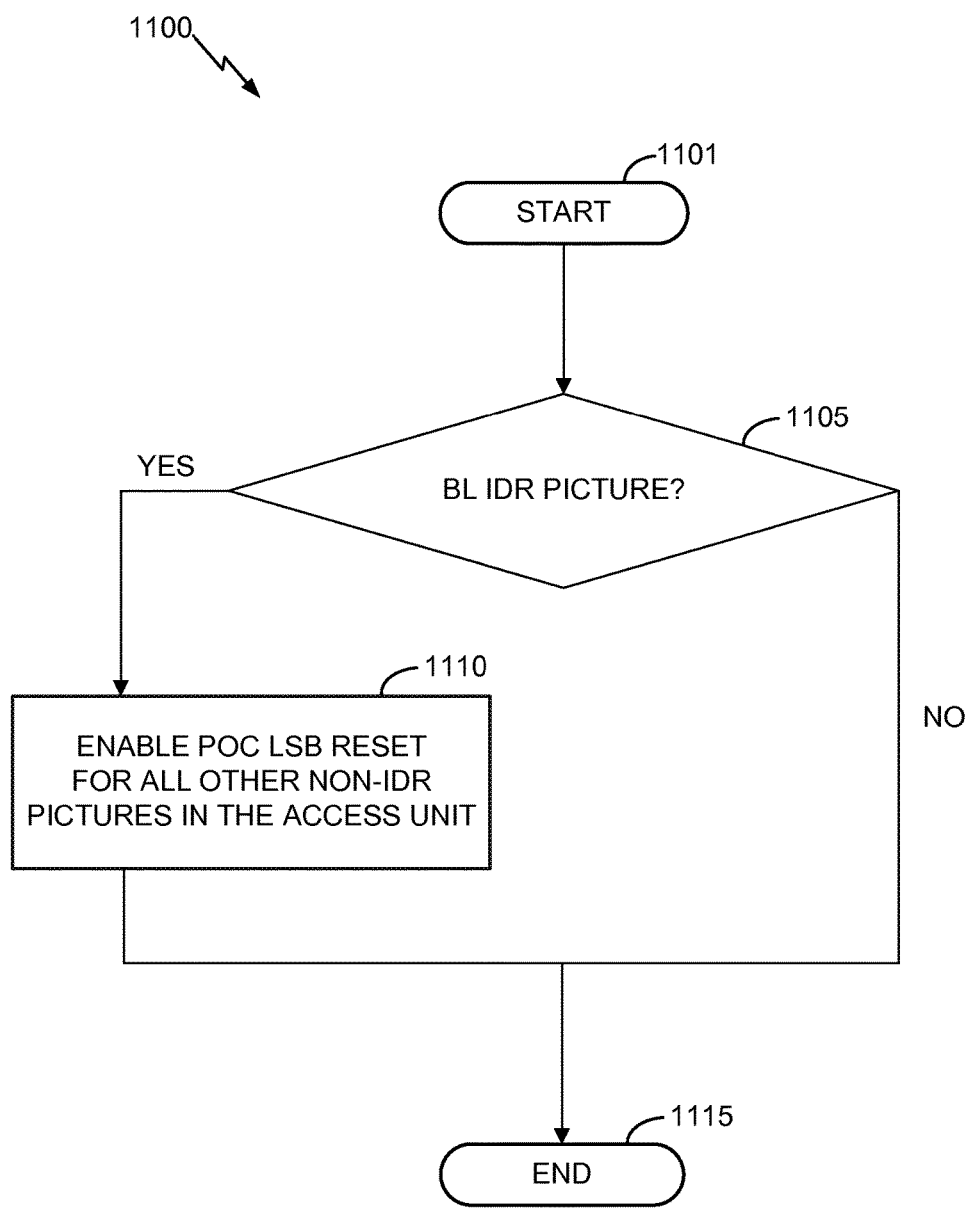
FIG. 11 is a flow chart illustrating a method of coding video information, according to one embodiment of the present disclosure.

FIG. 11 is a flowchart illustrating a method 1100 for coding video information, according to an embodiment of the present disclosure. The steps illustrated in FIG. 11 may be performed by an encoder (e.g., the video encoder as shown in FIG. 2A or FIG. 2B), a decoder (e.g., the video decoder as shown in FIG. 3A or FIG. 3B), or any other component. For convenience, method 1100 is described as performed by a coder, which may be the encoder, the decoder, or another component.

The method 1100 begins at block 1101. At block 1105, the coder determines whether a picture is a base layer IDR picture. In some embodiments, the POC of a BL IDR picture is automatically reset to 0. If the coder determines that the picture is a BL IDR picture, the method 1100 proceeds to block 1110. Otherwise, the method 1100 ends at 1115.

At block 1110, the coder enables a POC LSB reset for all other non-IDR pictures in the access unit. For example, the coder may signal a POC LSB reset flag (e.g., poc_lsb_reset_flag) having a value of 1, indicating that a POC LSB reset is to be performed for each of the non-IDR pictures in the same access unit as the BL IDR picture. The method 1100 ends at 1115.

As discussed above, one or more components of video encoder 20 of FIG. 2A, video encoder 23 of FIG. 2B, video decoder 30 of FIG. 3A, or video decoder 33 of FIG. 3B (e.g., inter-layer prediction unit 128 and/or inter-layer prediction unit 166) may be used to implement any of the techniques discussed in the present disclosure, such as determining whether a picture is a BL IDR picture, and enabling a POC LSB reset for all other non-IDR pictures in the access unit.

In the method 1100, one or more of the blocks shown in FIG. 11 may be removed (e.g., not performed) and/or the order in which the method is performed may be switched. Thus, the embodiments of the present disclosure are not limited to or by the example shown in FIG. 11, and other variations may be implemented without departing from the spirit of this disclosure.

Signaling Backup Reset in Subsequent Pictures

In some embodiments, for each picture picA that resets its POC MSB value in order to align the derived POC (e.g., PicOrderCntVal) with another picture that is an IRAP picture with NoRaslOutputFlag equal to 1 and that is in the same access unit as picA, an indication may be provided in the bitstream in association with one or more pictures in the same layer as picA that follow picA in decoding order that a POC MSB reset is to be performed with the one or more pictures. For example, poc_msb_reset_flag having a value of 1 may be signaled for each of the one or more pictures.

Figure 12:
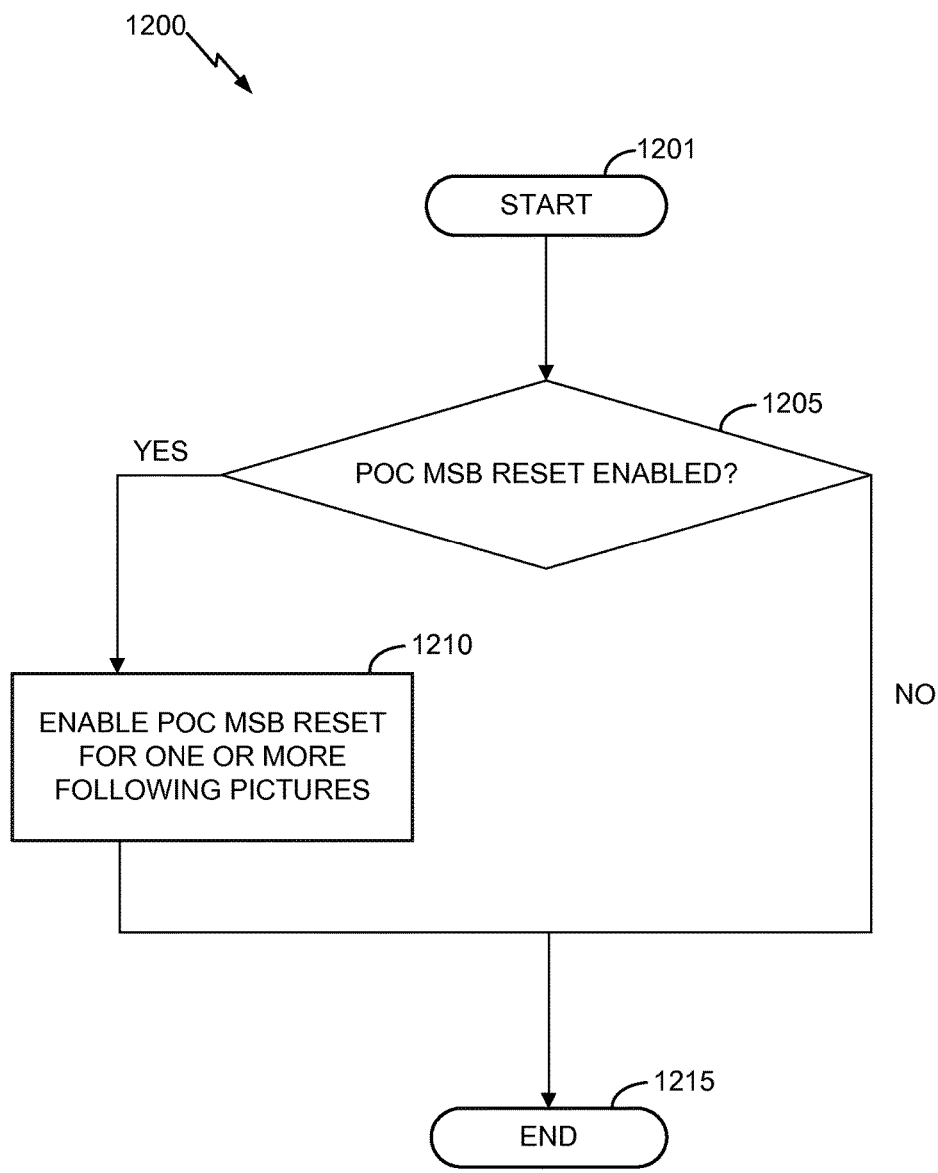
FIG. 12 is a flow chart illustrating a method of coding video information, according to one embodiment of the present disclosure.

FIG. 12 is a flowchart illustrating a method 1200 for coding video information, according to an embodiment of the present disclosure. The steps illustrated in FIG. 12 may be performed by an encoder (e.g., the video encoder as shown in FIG. 2A or FIG. 2B), a decoder (e.g., the video decoder as shown in FIG. 3A or FIG. 3B), or any other component. For convenience, method 1200 is described as performed by a coder, which may be the encoder, the decoder, or another component.

The method 1200 begins at block 1201. At block 1205, the coder determines whether a POC MSB reset is to be performed at a particular picture. As described above, in some embodiments, a POC MSB reset may be performed in order to prevent pictures in different layers from having inconsistent POC values in a non-aligned IRAP access unit. In some embodiments, the coder further determines whether the particular picture is a non-IRAP picture in a non-aligned IRAP access unit. If the coder determines that a POC MSB reset is to be performed at the particular picture, the method 1200 proceeds to block 1210. Otherwise, the method 1200 ends at 1215.

At block 1210, the coder enables a POC MSB reset for one or more pictures that follow the particular picture in decoding order. In some embodiments, the one or more pictures may be in the same layer as the particular picture. For example, the coder may signal a POC MSB reset flag (e.g., poc_msb_reset_flag) having a value of 1 for the picture that immediately follows the particular picture in decoding order, indicating that a POC MSB reset is to be performed for the picture that immediately follows the particular picture in decoding order. As described above, if the particular picture having an indication that a POC MSB reset is to be performed is lost, a back-up reset of the POC MSB at the picture that immediately follows the particular picture in decoding order based on the indication associated with the picture that immediately follows the particular picture in decoding order. In some embodiments, the coder may further provide an indication or variable that may be used so that the POC MSB reset is not performed more than once. Such an indication or variable (e.g., a POC reset ID) may help in determining whether the POC MSB reset has been performed. In some embodiments, the coder enables the POC MSB reset for the one or more pictures only if the particular picture is a non-IRAP picture in a non-aligned IRAP access unit. The method 1200 ends at 1215.

As discussed above, one or more components of video encoder 20 of FIG. 2A, video encoder 23 of FIG. 2B, video decoder 30 of FIG. 3A, or video decoder 33 of FIG. 3B (e.g., inter-layer prediction unit 128 and/or inter-layer prediction unit 166) may be used to implement any of the techniques discussed in the present disclosure, such as determining whether a POC MSB reset is to be performed at a particular picture, and enabling a POC MSB reset for one or more pictures that follow the particular picture in decoding order.

In the method 1200, one or more of the blocks shown in FIG. 12 may be removed (e.g., not performed) and/or the order in which the method is performed may be switched. Thus, the embodiments of the present disclosure are not limited to or by the example shown in FIG. 12, and other variations may be implemented without departing from the spirit of this disclosure.

Signaling POC Values of Preceding Pictures

In some embodiments, for picture picA that resets its POC value in order to align the derived PicOrderCntVal with an IDR picture that has nuh_layer_id equal to 0 and that is in the same access unit as picA, the value of PicOrderCntVal of picA before POC reset is signaled for one or more pictures that follow picA in decoding order and that have the same nuh_layer_id as picA.

Example Implementation: Slice Segment Header Syntax

The following example slice segment header syntax may be used to implement one or more of the embodiments described herein.

TABLE 1

Example Slice Segment Header Syntax

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     i = 0 | |
|     if( num_extra_slice_header_bits > i ) { | |
|       i++ | |
|       poc_msb_reset_flag | u(1) |
|     } | |
|     if( num_extra_slice_header_bits > i ) { | |

TABLE 1-continued

Example Slice Segment Header Syntax

| | Descriptor |
|---|---|
|       i++ | |
|       poc_lsb_reset_flag | u(1) |
|     } | |
|     if( num_extra_slice_header_bits > i ) { | |
|       i++ | |
|       discardable_flag | u(1) |
|     } | |
|     for( ~~i = 1~~ ; i < num_extra_slice_header_bits; i++ ) | |
|       slice_reserved_flag[ i ] | u(1) |
|   slice_type | ue(v) |
|   if( output_flag_present_flag ) | |
|     pic_output_flag | u(1) |
|   if( separate_colour_plane_flag == 1 ) | |
|     colour_plane_id | u(2) |
|   if( nuh_layer_id > 0 \|\| | |
|     ( nal_unit_type != IDR_W_RADL && | |
|     nal_unit_type != | |
|     IDR_N_LP ) ) { | |
|     slice_pic_order_cnt_lsb | u(v) |
| ... | |

Example Implementation: Slice Segment Header Semantics

The following example semantics may be used to implement one or more of the embodiments described herein. Changes to the existing language in the HEVC specification are shown in italics.

poc_msb_reset_flag equal to 1 specifies that the MSB value of the derived picture order count for the current picture is equal to 0. poc_msb_reset_flag equal to 0 specifies that the MSB value of the derived picture order count for the current picture may or may not be equal to 0.

When the current picture is not an IRAP picture with NoRaslOutputFlag equal to 1 and at least one picture in the current access unit is an IRAP picture with NoRaslOutputFlag equal to 1, poc_msb_reset_flag shall be present and the value shall be equal to 1.

When not present, the value of poc_msb_reset_flag is inferred to be equal to 0.

poc_lsb_reset_flag equal to 1 specifies that the derived picture order count for the current picture is equal to 0. poc_lsb_reset_flag equal to 0 specifies that the derived picture order count for the current picture may or may not be equal to 0.

When the current picture is not an IDR picture or slice_pic_order_cnt_lsb is not equal to 0, and the picture with nuh_layer_id equal to 0 in the current access unit is an IDR picture, poc_lsb_reset_flag shall be present and the value shall be equal to 1.

When not present, the value of poc_lsb_reset_flag is inferred to be equal to 0.

When the value of poc_msb_reset_flag is equal to 0, the value of poc_lsb_reset_flag shall be equal to 0.

It is a requirement of bitstream conformance that, when there is an IRAP picture with NoRaslOutputFlag equal to 1 in the current access unit, the current picture shall have discardable_flag equal to 0 and TemporalId greater than 0, and shall not be a sub-layer non-reference picture, a RASL picture, or a RADL picture.

Alternatively, the following constraints could be added to the semantics of the poc_msb_reset_flag and poc_lsb_reset_flag:

It is a requirement of bitstream conformance that for slices that have value of nal_unit_type to be less than 16, and that have nal_unit_type % 2=0, the value of both poc_lsb_reset_flag and poc_msb_reset_flag shall be equal to 0.

It is a requirement of bitstream conformance that when the value of either poc_lsb_reset_flag or poc_msb_reset_flag, or both, is equal to 1, the value of discardable_flag, when present, shall be equal to 0.

It is a requirement of bitstream conformance that when an access unit contains a picture that is an IRAP picture with NoRaslOutputFlag equal to 1, then the following conditions apply: (1) if the picture with nuh_layer_id equal to 0 is an IDR picture, the value of poc_lsb_reset_flag and poc_msb_reset_flag shall be both set equal to 1 for all pictures in that access unit that have nuh_layer_id not equal to 0; and (2) otherwise, the value of poc_lsb_reset_flag shall be set equal to 1 and the value of poc_msb_reset_flag shall be both set equal to 1 for all pictures in that access unit that are no IRAP picture with NoRaslOutputFlag equal to 1.

Example Implementation: Decoding Process for POC and Reference Picture Set

An example derivation of the POC for each slice is described below. When the value of poc_lsb_reset_flag or the poc_msb_reset_flag is set to 1, the POC of the current picture and all the pictures in the DPB that are marked as "used for reference" or that are needed for output are decremented.

Decoding Process for Picture Order Count

Output of this process is PicOrderCntVal, the picture order count of the current picture.

Picture order counts are used to identify pictures, for deriving motion parameters in merge mode and motion vector prediction, and for decoder conformance checking.

Each coded picture is associated with a picture order count variable, denoted as PicOrderCntVal.

When the current picture is not an IRAP picture with NoRaslOutputFlag equal to 1, the variables prevPicOrderCntLsb and prevPicOrderCntMsb are derived as follows:

Let prevTid0Pic be the previous picture in decoding order that has TemporalId equal to 0 and nuh_layer_id equal to nuh_layer_id of the current picture and that is not a RASL picture, a RADL picture, or a sub-layer non-reference picture, and let prevPicOrderCnt be equal to PicOrderCntVal of prevTid0Pic.

The variable prevPicOrderCntLsb is set equal to prevPicOrderCnt & (MaxPicOrderCntLsb−1).

The variable prevPicOrderCntMsb is set equal to prevPicOrderCnt−prevPicOrderCntLsb.

The variable PicOrderCntMsb of the current picture is derived as follows:

If the current picture is an IRAP picture with NoRaslOutputFlag equal to 1, PicOrderCntMsb is set equal to 0.

Otherwise, PicOrderCntMsb is derived as follows:
if((slice_pic_order_cnt_lsb<prevPicOrderCntLsb) &&
 ((prevPicOrderCntLsb−slice_pic_order_cnt_lsb)>=
  (MaxPicOrderCntLsb/2)))
 PicOrderCntMsb=prevPicOrderCntMsb+MaxPicOrderCntLsb
else if((slice_pic_order_cnt_lsb>prevPicOrderCntLsb)
 &&
 ((slice_pic_order_cnt_lsb−prevPicOrderCntLsb)>
  (MaxPicOrderCntLsb/2)))
 PicOrderCntMsb=prevPicOrderCntMsb−MaxPicOrderCntLsb
else
 PicOrderCntMsb=prevPicOrderCntMsb
PicOrderCntVal is derived as follows:

PicOrderCntVal=(poc_msb_reset_flag ? 0: PicOrderCntMsb)+(poc_lsb_reset_flag ? 0: slice_pic_order_cnt_lsb)

It should be noted that all IDR pictures that have nuh_layer_id equal to 0 will have PicOrderCntVal equal to 0 since slice_pic_order_cnt_lsb is inferred to be 0 for IDR pictures and prevPicOrderCntLsb and prevPicOrderCntMsb are both set equal to 0.

When poc_msb_reset_flag is equal to 1, the PicOrderCntVal of each picture that is in the DPB and belongs to the same layer as the current picture is decremented by PicOrderCntMsb.

When poc_lsb_reset_flag is equal to 1, the PicOrderCntVal of each picture that is in the DPB and belongs to the same layer as the current picture is decremented by slice_pic_order_cnt_lsb.

The value of PicOrderCntVal shall be in the range of −231 to 231−1, inclusive. In one CVS, the PicOrderCntVal values for any two coded pictures in the same layer shall not be the same.

The function PicOrderCnt(picX) is specified as follows:
PicOrderCnt(picX)=PicOrderCntVal of the picture picX The function DiffPicOrderCnt(picA, picB) is specified as follows:
DiffPicOrderCnt(picA, picB)=PicOrderCnt(picA)−PicOrderCnt(picB) The bitstream shall not contain data that result in values of DiffPicOrderCnt(picA, picB) used in the decoding process that are not in the range of −215 to 215−1, inclusive.

It should be noted that if X is the current picture and Y and Z are two other pictures in the same sequence, Y and Z are considered to be in the same output order direction from X when both DiffPicOrderCnt(X, Y) and DiffPicOrderCnt(X, Z) are positive or both are negative.

Decoding Process for Reference Picture Set

The decoding process for the reference picture set is identical to the decoding process defined in MV-HEVC WD5.

Example Implementation: General SEI Payload Syntax

The following example SEI payload syntax may be used to implement one or more of the embodiments described herein. In the example below, "XXX" may be replaced with any value representing the payload type that may be utilized in connection with the example syntax. For example, "XXX" may be replaced with any value between 1 and 255 not already used by another SEI message. In another example, the value of "XXX" is not limited to 255, and have a higher value. Changes to the existing language in the HEVC specification are shown in italics.

TABLE 2

Example SEI Payload Syntax

| | Descriptor |
|---|---|
| sei_payload( payloadType, payloadSize ) { | |
|  if( nal_unit_type = = PREFIX_SEI_NUT ) | |
|   if( payloadType = = 0 ) | |
|   ... | |
|   else if( payloadType = = XXX ) | |
|    three_dimensional_reference_displays_info | |
|    ( payloadSize ) | |
|   *else if( payloadType = = XXX )* | |
|    *poc_reset_info( payloadSize )* | |
|   ... | |
|   else | |
|    reserved_sei_message( payloadSize ) | |
|  else /* nal_unit_type = = SUFFIX_SEI_NUT */ | |

TABLE 2-continued

Example SEI Payload Syntax

| | Descriptor |
|---|---|
| if( payloadType = = 3 ) | |
|   filler_payload( payloadSize ) | |
| ... | |
| else | |
|   reserved_sei_message( payloadSize ) | |
| if( more_data_in_payload( ) ) { | |
|   if( payload_extension_present( ) ) | |
|     reserved_payload_extension_data | u(v) |
|   payload_bit_equal_to_one /* equal to 1 */ | f(1) |
|   while( !byte_aligned( ) ) | |
|     payload_bit_equal_to_zero /* equal to 0 */ | f(1) |
|   } | |
| } | |

Example Implementation: POC Reset Information SEI Message Syntax

The following example POC reset information syntax may be used to implement one or more of the embodiments described herein. Changes to the existing language in the HEVC specification are shown in italics.

TABLE 3

Example POC Reset Information Syntax

| | Descriptor |
|---|---|
| *poc_reset_info(payloadSize ) {* | |
|   *poc_reset_type_flag* | *u(1)* |
|   *poc_reset_value* | *u(32)* |
|   *poc_reset_id* | *u(7)* |
| *}* | |

In some embodiments, poc_reset_value, poc_reset_id, or both, are coded using exponential-Golomb codes (e.g., ue(v) coding).

Example Implementation: POC Reset Information SEI Message Semantics

The following example POC reset information semantics may be used to implement one or more of the embodiments described herein: "The POC reset information SEI message provides information that enables correct POC derivation for the associated picture even when the previous picture in decoding order in the same layer as the associated picture and that has poc_lsb_reset_flag or poc_msb_reset_flag equal to 1 is lost. The information contained in the SEI message can also be used to derive the POC values of other pictures in the DPB that are in the same layer as the associated picture. POC-reset picture is defined as a picture that has the value of either poc_msb_reset_flag or poc_lsb_reset_flag, or both, equal to 1. The associated POC-reset picture refers to the previous picture in decoding order in the same layer as the associated picture and that has poc_lsb_reset_flag or poc_msb_reset_flag equal to 1. The associated picture of a POC reset information SEI message refers to the picture that is associated with the SEI message. A non-nested POC reset information SEI message is associated with the picture for which the first VCL NAL unit in decoding order is the associated VCL NAL unit of the SEI NAL unit containing the non-nested POC reset information SEI message. The nuh_layer_id of the SEI NAL unit containing a non-nested POC reset information SEI message shall be equal to the nuh_layer_id of the associated picture."

Alternatively, the association of the SEI message may be defined as follows: "A non-nested POC reset information SEI message is associated with the picture picA in the next access unit in decoding, where picA has the same value of nuh_layer_id as the SEI NAL unit containing the non-nested POC reset information SEI message."

Alternatively, the association of the SEI message may be defined as follows: "A non-nested POC reset information SEI message is associated with the picture picA that has the same value nuh_layer_id as the SEI NAL unit, and succeeds, in decoding order, the SEI message and precedes the first picture that has the same value of nuh_layer_id as the SEI NAL unit and has the values of poc_lsb_reset_flag or poc_msb_reset_flag as equal to 1."

Alternatively, an empty SEI message indicating the cancellation of the POC reset information (poc_reset_info_cancel( )) may be signaled and the association of the SEI message may be defined as follows: "A non-nested POC reset information SEI message is associated with the first picture picA that has the same value of nuh_layer_id as the SEI NAL unit, that succeeds the SEI message in decoding order, and that is contained in the access unit containing a poc_reset_info_cancel( ) SEI message. The value of nuh_layer_id of the SEI NAL unit containing the poc_reset_info_cancel( ) SEI message shall be equal to the nuh_layer_id of the associated picture."

The following semantics may be used for poc_reset_type_flag, poc_reset_value, and poc_reset_id: "poc_reset_type_flag equal to 1 indicates that the POC MSB was reset and POC LSB was not reset for the associated POC-reset picture. poc_reset_type_flag equal to 0 specifies that both the POC MSB and POC LSB were reset for the associated POC-reset picture; poc_reset_value indicates the POC value of the associated POC-reset picture before POC resetting is applied (i.e. the derived POC value assuming both poc_msb_reset_flag and poc_lsb_reset_flag are equal to 0); and poc_reset_id specifies an identifier of a POC-reset picture in the same layer as the associated picture. No two consecutive POC-reset pictures of a particular layer in the bitstream shall have the same value of poc_reset_id."

It should be noted that, when the associated POC-reset picture is lost, this value can also be used to derive the POC values of the associated picture and other decoded pictures of the same layer in the DPB, as follows. When the value of poc_reset_type_flag is equal to 0, the POC of the associated picture can be derived by setting prevPicOrderCntLsb equal to poc_reset_value % MaxPicOrderCntLsb, and prevPicOrderCntMsb equal to 0, and following the rest of the decoding process for the picture order count, and the value of PicOrderCntVal of all the pictures in the DPB that belong to the same layer as the associated picture are decremented by poc_reset_value−poc_reset_value % MaxPicOrderCntLsb. When the value of poc_reset_type_flag is equal to 1, the POC of the associated picture can be derived by setting prevPicOrderCntLsb and prevPicOrderCntMsb both equal to 0, and following the rest of the decoding process for the picture order count, and the value of PicOrderCntVal of all the pictures in the DPB that belong to the same layer as the associated picture are decremented by poc_reset_value.

In some embodiments, syntax elements similar those described above in connection with SEI messages are included in the slice segment header syntax, and the phrase "current picture" is used instead of the phrase "associated picture" in the example semantics described above in connection with POC reset information SEI message semantics.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to code video information, the apparatus comprising:
a memory configured to store video data associated with a first access unit; and
a processor in communication with the memory, the processor configured to:
determine that the first access unit contains at least one picture that is an intra random access point (IRAP) picture associated with a first indication that random access skipped leading (RASL) pictures of the at least one picture are not to be output; and
in response to the determination that the first access unit contains at least one picture that is an IRAP picture associated with the first indication, encode or decode a second indication, in a bitstream, to reset only one or more most significant bits (MSBs), and not one or more least significant bits (LSBs), of a picture order count (POC) of each picture in the first access unit that is not an IRAP picture associated with the first indication to zero.

2. The apparatus of claim 1, wherein the processor is further configured to encode or decode one or more flags in the bitstream that indicate that only the one or more MSBs of the POC of said each picture in the first access unit that is not an IRAP picture associated with the first indication are to be reset.

3. The apparatus of claim 2, wherein the processor is configured to provide the indication in the bitstream by signaling one or more first flags each have a value of 1 that indicate that one or more most significant bits (MSBs) of the POC of the at least one other picture are to be reset and one or more second flags that indicate that one or more least significant bits (LSBs) of the POC of the at least one other picture are to be reset.

4. The apparatus of claim 1, wherein at least one of said at least one picture in the first access unit is in an enhancement layer.

5. The apparatus of claim 1, wherein the first indication comprises a flag, wherein the flag having a value of 1 indicates that RASL pictures of a picture associated with the flag are not to be output.

6. The apparatus of claim 5, wherein the flag is NoRaslOutputFlag processor is further configured to signal the one or more flags by indicating that one or more MSBs of the POC of each of the one or more pictures are to be reset.

7. The apparatus of claim 1, wherein the processor is further configured to determine that the first access unit immediately follows a splice point, wherein the processor is further configured to encode or decode the second indication in the bitstream in response to the determination that the first access unit immediately follows a splice point.

8. The apparatus of claim 1, wherein the apparatus comprises an encoder, and wherein the processor is further configured to encode the video information in the bitstream.

9. The apparatus of claim 1, wherein the apparatus comprises a decoder, and wherein the processor is further configured to decode the video information in the bitstream.

10. The apparatus of claim 1, wherein the apparatus comprises a device selected from the group consisting of computers, notebooks, laptops, tablet computers, set-top boxes, telephone handsets, smart phones, smart pads, televisions, cameras, display devices, digital media players, video gaming consoles, and in-car computers.

11. A method of encoding or decoding video information, the method comprising:
determining that a first access unit contains at least one picture that is an intra random access point (RAP) picture associated with a first indication that random access skipped leading (RASL) pictures of the at least one picture are not to be output; and
in response to determining that the first access unit contains at least one picture that is an RAP picture associated with the first indication, encoding or decoding a second indication, in a bitstream, to reset only one or more most significant bits (MSBs), and not one or more least significant bits (LSBs), of a picture order count (POC) of each picture in the first access unit that is not an RAP picture associated with the first indication to zero.

12. The method of claim 11, further comprising encoding or decoding one or more flags in the bitstream that indicate that only the one or more MSBs of the POC of said each picture in the first access unit that is not an RAP picture associated with the first indication are to be reset.

13. The method of claim 12, wherein the one or more flags each have a value of 1 providing the indication in the bitstream comprises signaling one or more first flags that indicate that one or more most significant bits (MSBs) of the POC of the at least one other picture are to be reset and one or more second flags that indicate that one or more least significant bits (LSBs) of the POC of the at least one other picture are to be reset.

14. The method of claim 11, wherein at least one of said at least one picture in the first access unit is in an enhancement layer.

15. The method of claim 11, wherein the first indication comprises a flag, wherein the flag having a value of 1 indicates that RASL pictures of a picture associated with the flag are not to be output.

16. The method of claim 15, wherein flag is NoRaslOutputFlag signaling the one or more flags comprises indicating that one or more MSBs of the POC of each of the one or more pictures are to be reset.

17. The method of claim 11, further comprising determining that the first access unit immediately follows a splice point, and encoding or decoding the second indication in the bitstream in response to determining that the first access unit immediately follows a splice point.

18. A non-transitory computer readable medium comprising code that, when executed, causes an apparatus to:
storing video data associated with a first access unit;
determine that the first access unit contains at least one picture that is an intra random access point (RAP) picture associated with a first indication that random access skipped leading (RASL) pictures of the at least one picture are not to be output; and
in response to the determination that the first access unit contains at least one picture that is an RAP picture associated with the first indication, encode or decode a second indication, in a bitstream, to reset only one or more most significant bits (MSBs), and not one or more least significant bits (LSBs), of a picture order count (POC) of each picture in the first access unit that is not an IRAP picture associated with the first indication to zero.

19. The computer readable medium of claim 18, wherein the code, when executed, further causes the apparatus to encode or decode one or more flags in the bitstream that indicate that only the one or more MSBs of the POC of said each picture in the first access unit that is not an IRAP picture associated with the first indication are to be reset.

20. The computer readable medium of claim 18, wherein the first indication comprises a flag, wherein the flag having a value of 1 indicates that RASL pictures of a picture associated with the flag are not to be output.

21. The computer readable medium of claim 20, wherein the flag is NoRaslOutputFlag.

22. A video coding device configured to code video information, the video coding device comprising:
means for storing video data associated with a first access unit;
means for determining that the first access unit contains at least one picture that is an intra random access point (IRAP) picture associated with a first indication that random access skipped leading (RASL) pictures of the at least one picture are not to be output; and
means for encoding or decoding a second indication, in a bitstream, to reset only one or more most significant bits (MSBs), and not one or more least significant bits (LSBs), of a picture order count (POC) of each picture in the first access unit that is not an IRAP picture associated with the first indication to zero in response to the determination that the first access unit contains at least one picture that is an IRAP picture associated with the first indication.

23. The video coding device of claim 22, further comprising means for encoding or decoding one or more flags in the bitstream that indicate that only the one or more MSBs of the POC of said each picture in the first access unit that is not an IRAP picture associated with the first indication are to be reset.

24. The video coding device of claim 22, wherein the first indication comprises a flag, wherein the flag having a value of 1 indicates that RASL pictures of a picture associated with the flag are not to be output.

25. The video coding device of claim 24, wherein the flag is NoRaslOutputFlag.

* * * * *